United States Patent
Furukawa et al.

[11] Patent Number: 5,835,005
[45] Date of Patent: Nov. 10, 1998

[54] POWER-LINE DATA TRANSMISSION METHOD AND SYSTEM UTILIZING RELAY STATIONS

[75] Inventors: Hirohisa Furukawa; Katsuhiro Wada, both of Kanagawa; Yoshitaka Inoue, Tokyo; Hiroshi Shimamoto; Hideki Sato, both of Kanagawa, all of Japan

[73] Assignee: Omron Corporation, Kyoto, Japan

[21] Appl. No.: 501,326

[22] Filed: Jul. 12, 1995

[30] Foreign Application Priority Data

Jul. 13, 1994 [JP] Japan ................................... 6-161507
Dec. 28, 1994 [JP] Japan ................................... 6-328426

[51] Int. Cl.⁶ ................................................ H04M 11/04
[52] U.S. Cl. .............................. 340/310.01; 340/310.06; 340/310.07; 340/310.28; 370/94.3; 370/60
[58] Field of Search ...................... 340/310.01, 310.05, 340/30.06, 310.07, 310.08, 538, 825.03, 826, 827, 825.02, 825.06, 825.01, 825.52; 370/94.1, 94.2, 94.3, 14, 16, 54, 60

[56] References Cited

U.S. PATENT DOCUMENTS

| | | | |
|---|---|---|---|
| 3,967,264 | 6/1976 | Whyte et al. ..................... | 340/310.08 |
| 4,427,968 | 1/1984 | York ................................. | 340/310.07 |
| 4,692,761 | 9/1987 | Robinton ......................... | 340/825.01 |
| 4,742,511 | 5/1988 | Johnson ........................... | 370/94 |
| 4,885,563 | 12/1989 | Johnson et al. ................ | 340/310.01 |
| 4,885,564 | 12/1989 | Vercellotti et al. ............ | 340/310.01 |
| 4,896,277 | 1/1990 | Vercellotti et al. ............ | 340/310.01 |
| 4,903,006 | 2/1990 | Boomgaard ..................... | 340/310.01 |
| 4,937,569 | 6/1990 | Trask et al. .................... | 340/310.06 |
| 4,939,726 | 7/1990 | Flammer et al. ............... | 370/94.1 |
| 5,032,833 | 7/1991 | Laporte ........................... | 340/825.02 |
| 5,061,922 | 10/1991 | Nishijima et al. ............. | 340/310.06 |
| 5,066,939 | 11/1991 | Mansfield, Jr. ................. | 340/310.01 |
| 5,115,433 | 5/1992 | Baran et al. ................... | 370/94.1 |
| 5,192,231 | 3/1993 | Dolin, Jr. ........................ | 439/620 |
| 5,351,272 | 9/1994 | Abraham ........................ | 340/310.08 |
| 5,416,777 | 5/1995 | Kirkham ......................... | 340/310.06 |
| 5,452,344 | 9/1995 | Larson ............................ | 340/310.01 |
| 5,457,689 | 10/1995 | Marvit et al. ................... | 340/310.06 |
| 5,548,639 | 8/1996 | Ogura et al. .................... | 379/221 |
| 5,577,030 | 11/1996 | Oki et al. ........................ | 340/825.03 |
| 5,604,868 | 2/1997 | Komine et al. ................. | 340/825.03 |

FOREIGN PATENT DOCUMENTS

| | | | |
|---|---|---|---|
| 362125723 | 6/1987 | Japan ............................... | 340/310.08 |
| 362250728 | 10/1987 | Japan ............................... | 340/310.08 |

*Primary Examiner*—Nina Tong
*Attorney, Agent, or Firm*—Dickstein Shapiro Morin & Oshinsky LLP

[57] ABSTRACT

When a sending station intends to transmit data to a target station to which the sending station cannot establish a direct link, the sending station searches for a station, i.e., a relay station which can communicate with the target station by retrieving a communication possible/impossible node list.

30 Claims, 21 Drawing Sheets

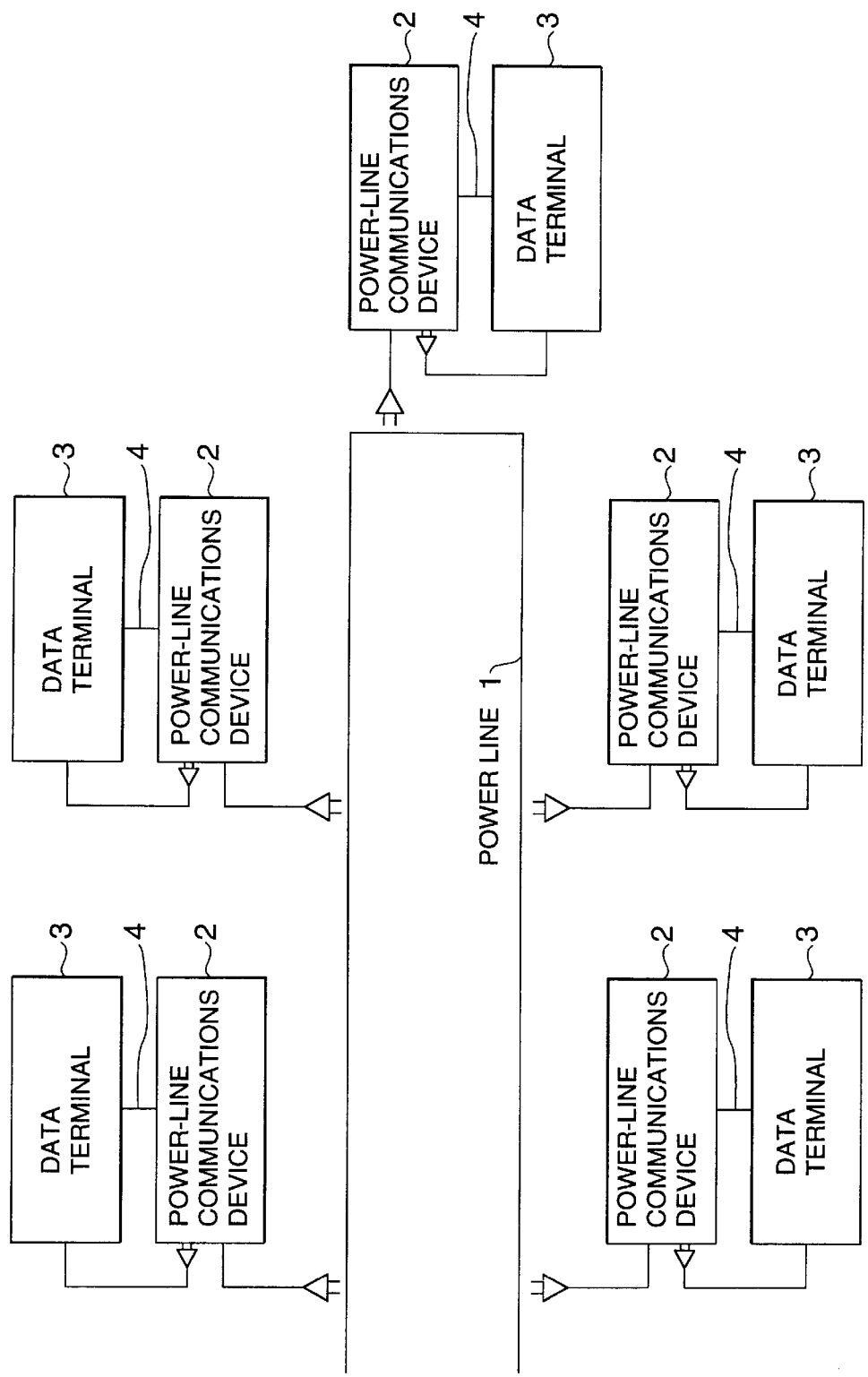

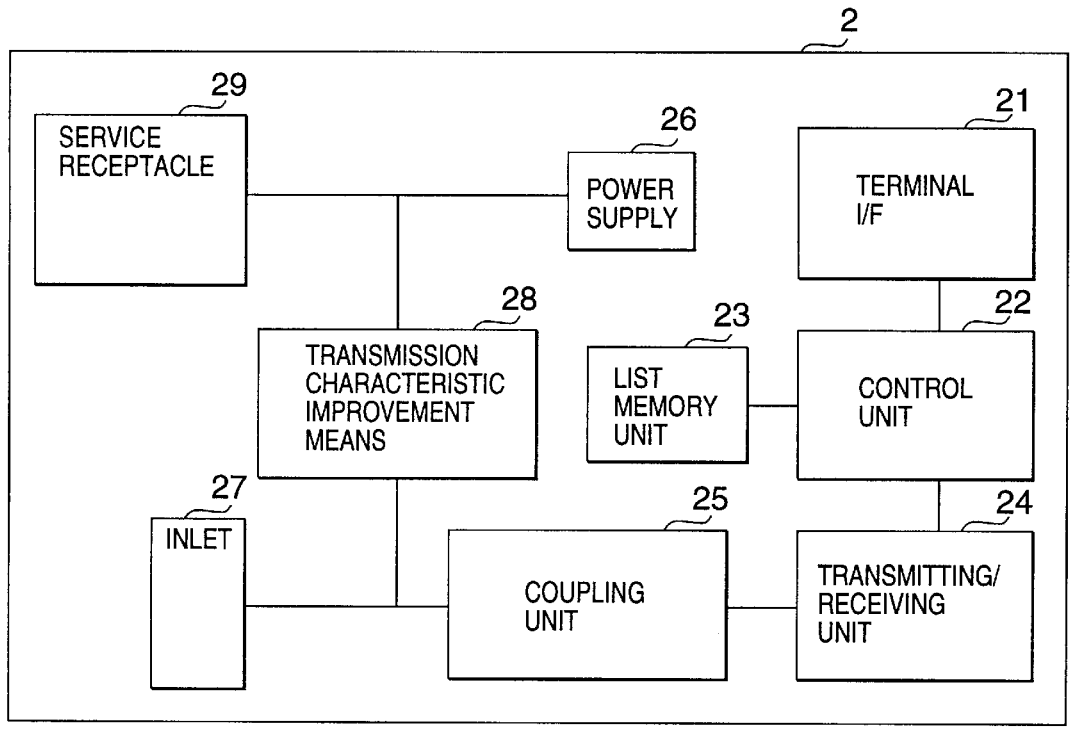

FIG. 5

① DIRECT LINK REQUEST/RESPONSE (a) REQUEST

| TARGET STATION ADDRESS | SELF STATION ADDRESS | DIRECT LINK REQUEST |
|---|---|---|
| TARGET STATION | COMMUNICATION STATION | |

(b) RESPONSE

| TARGET STATION ADDRESS | SELF STATION ADDRESS | DIRECT LINK POSSIBLE |
|---|---|---|
| COMMUNICATION STATION | TARGET STATION RELAY STATION | |

② RELAY LINK REQUEST/RESPONSE (c) REQUEST

| TARGET STATION ADDRESS | SELF STATION ADDRESS | DIRECT LINK REQUEST | NUMBER OF RELAY STATIONS | FINAL TARGET STATION ADDRESS |
|---|---|---|---|---|
| TARGET STATION | COMMUNICATION STATION | | | |

(d) RESPONSE

| TARGET STATION ADDRESS | SELF STATION ADDRESS | DIRECT LINK POSSIBLE | NUMBER OF RELAY STATIONS | FINAL TARGET STATION ADDRESS |
|---|---|---|---|---|
| COMMUNICATION STATION | TARGET STATION RELAY STATION | RELAY LINK IMPOSSIBLE | | |

③ DATA TRANSFER (e)

| TARGET STATION ADDRESS | SELF STATION ADDRESS | DATA |
|---|---|---|
| TARGET STATION RELAY STATION | COMMUNICATION STATION | |

FIG. 12A

| TARGET STATION ADDRESS (231) | DIRECT LINK POSSIBLE/ IMPOSSIBLE (232) | RELAY LINK POSSIBLE/ IMPOSSIBLE (233) | NUMBER OF RELAY STATIONS (234) | RELAY STATION ADDRESS (235) | REMARKS: PERIOD, DAY OF THE WEEK, TIME ZONE, ETC. (236) |
|---|---|---|---|---|---|
| ⑤ | × | | | | |
| | | | | | |

FIG. 12B

| TARGET STATION ADDRESS (231) | DIRECT LINK POSSIBLE/ IMPOSSIBLE (232) | RELAY LINK POSSIBLE/ IMPOSSIBLE (233) | NUMBER OF RELAY STATIONS (234) | RELAY STATION ADDRESS (235) | REMARKS: PERIOD, DAY OF THE WEEK, TIME ZONE, ETC. (236) |
|---|---|---|---|---|---|
| ⑤ | × | ○ | 1 | ③ | SPRING, WEEKDAYS, PM |
| | | | | | |

FIG. 12C

| TARGET STATION ADDRESS (231) | DIRECT LINK POSSIBLE/ IMPOSSIBLE (232) | RELAY LINK POSSIBLE/ IMPOSSIBLE (233) | NUMBER OF RELAY STATIONS (234) | RELAY STATION ADDRESS (235) | REMARKS: PERIOD, DAY OF THE WEEK, TIME ZONE, ETC. (236) |
|---|---|---|---|---|---|
| ② | ○ | | | | |
| ③ | ○ | | | | |
| ④ | ○ | | | | |
| ⑤ | × | ○ | 1 | ③ | SPRING, WEEKDAYS, PM |

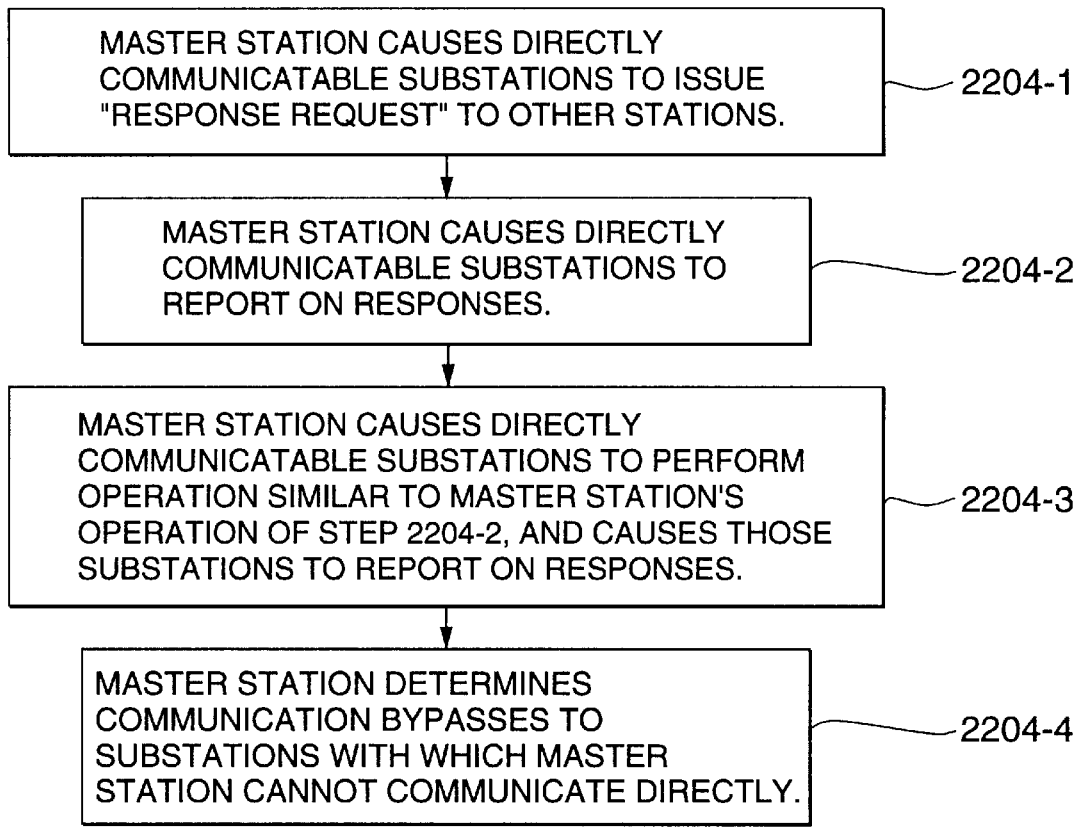

FIG. 25
|   | M | 1 | 2 | 3 | 4 |
|---|---|---|---|---|---|
| M |   | ○ | × | × | ○ |
| 1 | ○ |   | ○ | × | × |
| 2 | ○ | ○ |   | ○ | × |
| 3 | × | × | ○ |   | ○ |
| 4 | ○ | × | × | ○ |   |
FIG. 26
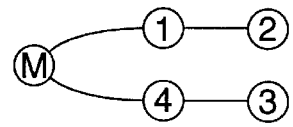
FIG. 27
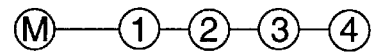
FIG. 28
PRIOR ART
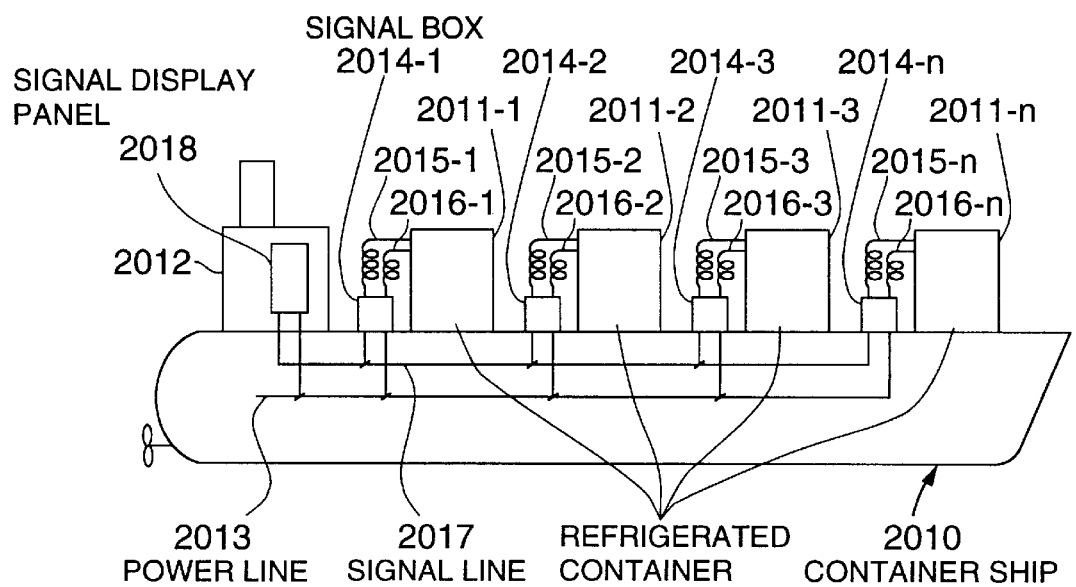

POWER-LINE DATA TRANSMISSION METHOD AND SYSTEM UTILIZING RELAY STATIONS

BACKGROUND OF THE INVENTION

1. Field of the Invention

The present invention relates to a power-line data transmission system and method which transmit data between nodes by power-line communication by connecting a plurality of nodes, each having a power-line communications device, and to a communications system which employs such a power-line data transmission system and method.

Moreover, the invention relates to a container carrier system, such as a container ship which carries a plurality of refrigerated containers, and a management information collecting method therefor. More particularly, the invention relates to a container carrier system in which management information of each of containers is collected by power-line communication through a power line and then displayed, and a management information collecting method therefor.

2. Description of the Related Art

A conventional data transmission system is made up of communication lines specialized for use with that system (hereinafter referred to as specialized lines) or LAN (Local Area Network) either of which is provided as a transmission line, and data terminals such as data collection means, data processing means, and display means connected to the communication lines.

When an attempt is made to implement such a data transmission system in an existing facility which is not originally intended for data transmission, it is necessary to lay new, specialized lines or LAN as a transmission line. This incurs enormous costs. In some cases, there is no alternative but to give up the implementation of the data transmission system for reasons of the enormous constitution costs.

One way to solve this problem is to use existing power lines in an existing facility as a data transmission line, thereby resulting in the implementation of an inexpensive and simple data transmission system. This method has already been put forward.

Specifically, all data terminals such as data collection means, data processing means and display means are connected to power lines via a power-line communications system, and data are transmitted between the data terminals over the power lines.

However, differing from the data transmission system consisting of specialized lines or LAN, the conventional data transmission system using power lines encounters problems as follows:

1) An impedance drop in a power line, or the like, due to noise caused by electrical appliances connected to the power line, or as a result of the connection of electrical appliances, results in a poor transmission environment. This hinders appropriate data transmission. In some cases, this may render communications impossible.

2) A power line is usually branched by a distribution panel to each of outlets. Even if a line-of-sight distance is short, the actual length of distribution of the power line will become considerably long. For this reason, the attenuation of transmitted/received signals becomes greater, and this attenuation renders communications impossible even when the line-of-sight is short.

Even when a SS (Spread Spectrum) modulation method, a transmission AGC technique, or an active receiving filter technique employed in a recent power-line communications system is used, these problems still remain incompletely solved, and hence it is impossible to implement a data transmission system which stably operates.

For a container ship which carries refrigerated containers, it is generally necessary to collectively control the state of each container.

In other words, each refrigerated container is equipped with its own refrigerator. To meet with a demand for constant appropriate operation, it is necessary for each refrigerated container to constantly monitor the conditions thereof as to 1) whether or not the refrigerator is in operation;
2) whether or not the temperature of the inside of the container is in excess of a given preset value; and
3) whether or not the refrigerator is in abnormal operation.

FIG. 28 schematically shows the configuration of a conventional container ship. This container ship 2010 carries a plurality of refrigerated containers 2011-1–2011-n, and the states of these refrigerated containers 2011-1–2011-n are constantly monitored by a collective management section 2012.

In other words, each of the refrigerated containers 2011-1–2011-n is provided with an unillustrated refrigerator, and is supplied with electric power from an electric power line 2013 via respective signal boxes 2014-1–2014-n and electric power lines 2015-1–2015-n. The temperatures of the inside of the refrigerated containers 2011-1–2011-n are always controlled to be a constant value.

Information representing the state of each of the refrigerated containers 2011-1–2011-n and information representing the temperature of each of the refrigerated containers are delivered to a signal line 2017 via signal boxes 2014-1–2014-n. The information on this signal line 2017 is represented on a signal display panel 2018 provided in the collective management section 2012.

FIG. 29 shows the details of the configuration of the refrigerated containers 2011-1–2011-n shown in FIG. 28. This refrigerated container 2011 is provided with a thermostatic chamber 2110, a refrigerator 2111, an electric power supply unit 2112, a signal unit 2113, and a temperature sensor 2114.

The refrigerator 2111 chills the thermostatic chamber 2110, and the temperature sensor 2114 detects the temperature of the inside of the thermostatic chamber 2110. The electric power supply unit 2112 feeds electric power to the refrigerator 2111 and a signal unit 2113.

The signal unit 2113 monitors the state of the refrigerator 2111 and an output from the temperature sensor 2114, and produces outputs of the following signals:

1) a refrigerator in-operation signal RUN representing that the refrigerator 2111 is in operation;
2) an over-preset-temperature signal TEMP representing that the temperature of the thermostatic chamber 2110 exceeded a preset temperature; and
3) a refrigerator abnormal operation signal TROUBLE representing that the operation of the refrigerator 2111 is abnormal.

The electric power supply unit 2112 is connected to an electric power supply plug 2123 via a three-phase, 440 V, an electric power line 2121. The signal unit 2113 is connected to a signal plug 2124 via a signal line 2122 over which the RUN, TEMP, and TROUBLE signals are transmitted.

FIG. 30 schematically shows the details of the configuration of the signal boxes 2014. The signal box 2014 has a power supply receptacle 2141 to be connected to a three-phase, 440 V, electric power line 2013 and a signal line receptacle 2142 to be connected to a signal line 2017. The electric power supply plug 2123 shown in FIG. 29 is coupled to this electric power receptacle 2141, whereas the signal plug 2124 shown in FIG. 29 is inserted into the signal receptacle 2142.

FIG. 31 shows the details of the configuration of the signal display panel 18 shown in FIG. 28. This signal display panel 18 is provided with an electric power supply unit 2181, a display circuit 2182, and a plurality of indicating lamps 2183.

The electric power supply unit 2181 is connected to the electric power line 2013 shown in FIG. 28 and generates electric power to be fed to the display circuit 2182 on the basis of the electric power from the electric power supply line 2013.

The plurality of indicating lamps 2183 are made up of a plurality of indicating lamps, and each of these indicating lamps shows any one of the refrigerator in-operation signal RUN, the over-preset-temperature signal TEMP, and the refrigerator abnormal operation signal TROUBLE corresponding to the state of each refrigerated container. The display circuit 2182 controls turn-on and turn-off of these indicating lamps 2183 based on the signal supplied over the signal line 2017.

The conventional container ship having the above configuration is arranged in such a way that each of the refrigerated containers 2011-1–2011-n is connected to the electric power line 2013 over which electric power is fed to the refrigerated containers 2011-1 to 2011-n and the signal line 2017 over which the signals RUN, TEMP, and TROUBLE are transmitted, as a result of the insertion of the electric power supply plug 2123 and the signal plug 2124 respectively to the electric power receptacle 2141 and the signal receptacle 2142 within the signal box 2014. Such a configuration requires the insertion or removal of the electric power receptacle 2141 and the signal receptacle 2142 within the signal box 2014 into or from the electric power supply plug 2123 and the signal plug 2124 every time the refrigerated containers are loaded into, or unloaded from, the container ship. Moreover, the electric power line 2013 and the signal line 2017 are as long as about 30 m, the removal and insertion of the lines are considerably time consuming and laborious.

SUMMARY OF THE INVENTION

In view of the above drawbacks in the prior art, the object of the present invention is to provide a power-line data transmission system and method which allows the stable transmission of data under conditions, that is, a poor transmission environment due to an impedance drop in an electric power line, or the like, resulting from the occurrence of noise in connected electric appliances or the connection of the electric appliances to the electric power line, or the elongation of an actual line length of the electric power line.

Another object of the invention is to provide a communications system using the above-mentioned power-line data transmission system and the power-line data transmission method therefor.

Still another object of the invention is to provide a container carrier system which allows easy collection of management information about each container of the container carrier system that carries a plurality of containers, and which requires less labor when containers are loaded or unloaded. A management information collection method for use in this container carrier system is also provided.

According to one aspect of the present invention, these objects are attained by a power-line data transmission system in which a plurality of nodes each having a power-line communications device are connected together by an electric power line and data is transmitted between the nodes by power-line communication, wherein:

when a sending station node cannot transmit data to a target station node, a node that can communicate with the target node station is searched for and designated as a relay station node, and data is transmitted to the target station node via the relay station node.

In this power-line data transmission system, each node stores information indicating whether data transmission can be performed with other nodes. Based on this information, it is judged whether data transmission can be performed with a target station node. If the judgment result is affirmative, a direct link is established to the target station node. If the judgment result is negative, a relay station is searched for based on the above information with which relay station data transmission can be performed, and which can establish a link to the target station node.

According to another aspect of the invention, there is provided a container carrier system which carries a plurality of containers mutually connected by an electric power line for feeding electric power, comprising:

a plurality of power-line communications means provided for the respective containers; and a power-line communications control means for collecting management information of each of the containers by performing power-line communication through the electric power line using the plurality of power-line communications means.

BRIEF DESCRIPTION OF THE DRAWINGS

FIG. 1 is a block diagram showing the configuration of a power-line data transmission system in one embodiment of the present invention;

FIG. 2 is a block diagram showing the configuration of the power-line communications device shown in FIG. 1;

FIG. 3 is a communication node list;

FIG. 5 is a diagram showing examples of formats of messages transmitted between a transmitting station and a relay station;

FIGS. 12A through 12C are tables illustrating specific communications node lists;

FIG. 22 is a diagram showing one example of the state of the power-line communications unit that is specified as being capable of carrying out direct communication as a result of the processing shown in FIG. 21;

FIG. 23 is a flow chart showing detailed operations carried out in a step 2204 of the flow chart shown in FIG. 23;

FIG. 24 is a diagram showing one example of results reported as a result of the execution of processing in a step 2204-2 of the flow chart shown in FIG. 23;

FIG. 25 is a diagram showing one example of results reported as a result of the execution of processing in a step 2204-3 of the flow chart shown in FIG. 23;

FIG. 26 is a diagram showing one example of the communications route specified by processing according to the flow chart shown in FIG. 23;

FIG. 27 is a diagram showing another example of the communications route specified by processing according to the flow chart shown in FIG. 23;

FIG. 28 is an outline schematically showing the configuration of a conventional refrigerated container ship;

DESCRIPTION OF THE PREFERRED EMBODIMENTS

Figure 4:
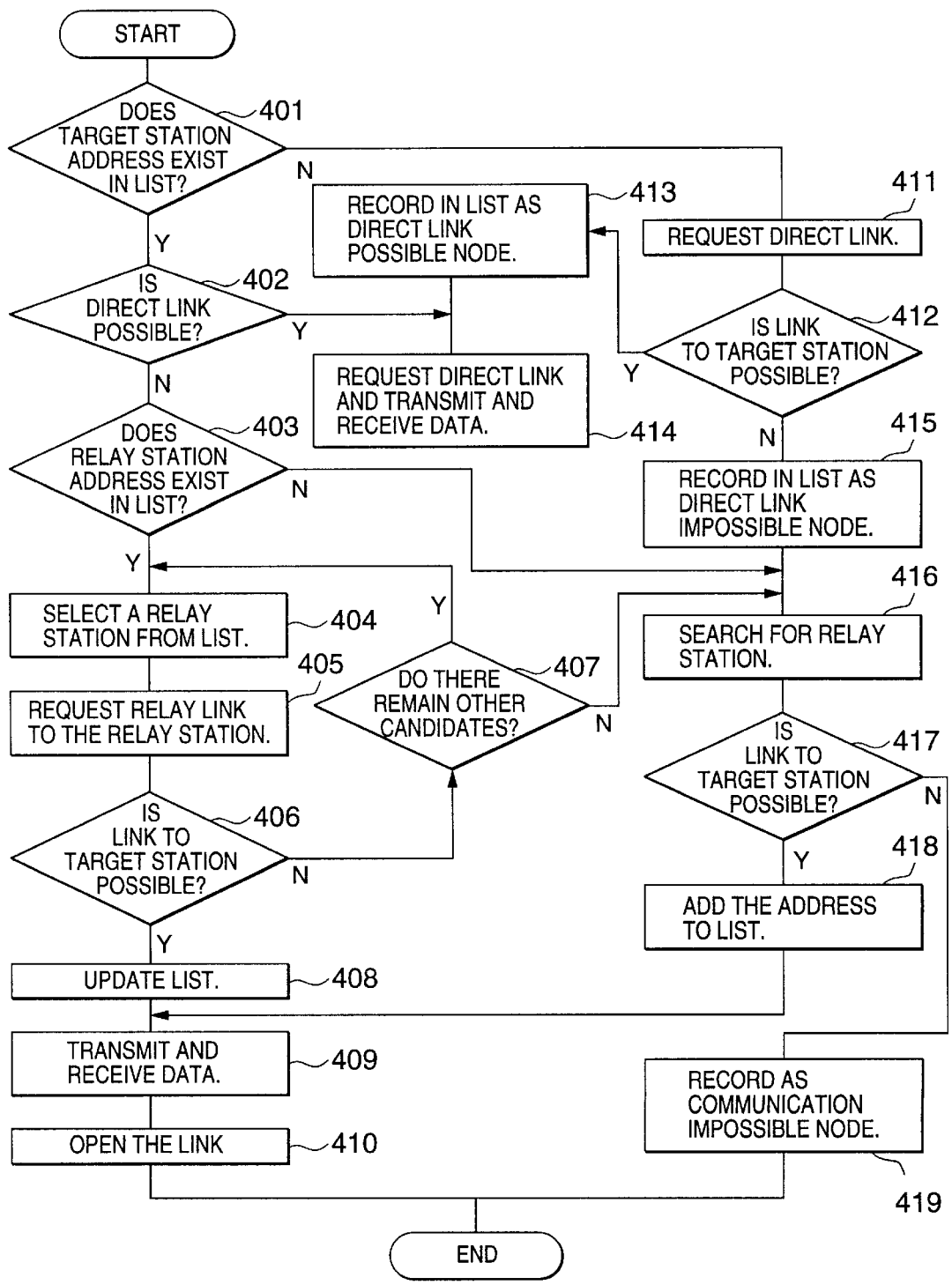
FIG. 4 is a flow chart showing processing operations at a transmitting station.

Referring to the accompanying drawings, preferred embodiments of the present invention will now be described.

FIG. 1 is a block diagram showing the configuration of a power-line data transmission system in one embodiment of the present invention.

This power-line data transmission system is made up of a plurality of data terminals 3 connected to an in-phase electric power line 1 having the same system via power-line communications devices 2. The power-line communications devices 2 are respectively connected to the data terminals 3 via signal lines 4. As will be described later, the data terminals 3 are powered through service receptacles provided in the power-line communications devices 2.

In this embodiment, when one of the data terminals 3 has data to be transferred but is incapable of directly communicating with another data terminal 3 on the opposite end (hereinafter referred to as a target station), still another data terminal 3 for which communication is possible is designated as a relay station, and data are transmitted to this relay station. Upon receipt of the data from the transmitting station, the relay station then transmits the data to the target station. It is possible to provide a plurality of relay stations between the transmitting station and the target station, and double or triple relay transmission is feasible.

The data terminal 3 can freely communicate with any other node, and each of the data terminals 3 has a relay function. The data terminals 3 are arranged in such a way as to relay signals, which are to be transmitted or received between nodes incapable of effecting communication, in accordance with a relay algorithm which will be described later.

FIG. 2 is a block diagram showing the configuration of the power-line communications device 2.

The power-line communications device 2 in this embodiment is made up of a terminal interface 21 electrically connected to the data terminal 3, a control unit 22 which controls the overall operation of the system, a list memory unit 23, a transmitting/receiving unit 24 which modulates and demodulates a signal to be transmitted over the electric power line and transmits and receives the signal to and from the electric power line, a coupling unit 25 for uploading the signal, which is to be transmitted and received, to the electric power line, an inlet 27 to which a power supply cable is connected, a transmission characteristic improvement means 28, and a service receptacle 29 for feeding electric power to the data terminal 3.

As shown in FIG. 3, the list memory unit 23 holds a communication possible/impossible node list (hereinafter simply referred to as a list) representing nodes where the data terminals 3 can effect communication and nodes where the data terminals 3 cannot effect communication.

This list comprises a target station address area 231 representing an address of a target station; a direct link possible/impossible area 232 representing whether or not a direct link to the target station is possible; a relay link possible/impossible area 233 representing whether or not a link to the target station via a relay station is possible when a direct link to the target station is impossible; a number-of-relay-station area 234 that represents the number of terminals which will become a relay station when it is possible to make a link to the target station via a relay station; a relay station address area 235 which represents an address of a relay station to which its own station has to carry out transmission; and a remark area 236 representing a duration over which a station can serve as a relay station, a day of the week, and a time zone.

In the case of a target station address (2) stored in the target station address area 231, it is possible to directly send data to the target station having the address (2) from the data terminal 3 concerned because the direct link possible/impossible area 232 shows that a direct link is possible (indicated by o).

In the case of a target station address (7) stored in the target station address area 231, it is impossible to directly send data to the target station having the address (7) from the data terminal 3 concerned because the direct link possible/impossible area 232 shows that a direct link is impossible (indicated by x). However, since the relay link possible/impossible area 233 shows that a relay link is possible (indicated by o), data can be sent to the target station via a relay station. The number of relay stations is only one or three as shown in the number-of-relay-station area 234. Moreover, as shown in the relay station address area 235, a relay address represents a relay station at an address (5) or relay stations at addresses (2), (4), and (9). The relay station located at the address (5) can serve as a relay station only on Sunday afternoon in summer, as shown in the remark area 236. On the other hand, the relay stations at the addresses (2), (4), and (9) can serve as a relay station only on weekday nights in winter.

In the case of a target station address (9) stored in the target station address area 231, neither data can be directly sent to the target station at the address (9) from the data terminal 3 concerned nor sent to the target station by way of relay stations.

The transmission characteristic improvement means 28 is interposed between the inlet 27 and the service receptacle 29. Two inductors, each having an arbitrary value, are connected in parallel in the transmission characteristic improvement means 28 to increase an inductor component of a series resonance circuit, so that a resonance point is shifted to a lower frequency band.

The power-line communications device 2 is provided with the service receptacle 29 in order to eliminate a lack of a receptacle for the data terminal 3 caused as a result of the use of a receptacle by the power-line communications device 2 itself to establish connection with the electric power line 1. The data terminal 3 is powered through this service receptacle 29.

When the power-line communications device 2 is connected to the electric power line 1, a series resonance circuit is created by a capacitance component of the power supply unit 26 of the power-line communications device 2 and the inductance component of the electric power line. This results in a low impedance being developed exactly within a band over which a data signal is transmitted and received. Thus, the signal to be transmitted and received is considerably attenuated, and stable power-line communications become impossible. The transmission characteristic improvement means 28 is provided to solve this problem.

The operation of the power-line data transmission system in this embodiment will now be described.

As shown in FIG. 4, the power-line communications device 2 at a sending station first refers to the list shown in FIG. 3 to search for an address of a target station (step 401). Unless the target station address is on the list (step 401: N), this target station address will be added to the target station address area 231 of the list by means of a method which will be described later. On the other hand, if the target station address is on the list (step 401: Y), it will be judged whether or not it is possible to make a direct link to this target station with reference to the contents of the direct link possible/ impossible area 232 of the list (step 402).

If the direct link is possible (step 402: Y), the sending station sends a direct link request to the target station using a format shown in FIG. 5(*a*) and carries out the transmission and receipt of data (step 414). However, if the direct link is impossible (step 402: N), it will be judged whether or not relay station addresses are included in the relay station address area 235 on the list (step 403). If there are relay station addresses (step 403: Y), a relay station address is selected from among them (step 404). The sending station requests a link to the target station via relay stations using a format shown in FIG. 5(*c*) (step 405).

In response to the relay link request from the sending station, the relay stations carry out operations which will be described later. That is, a relay link between the sending station and the target station is judged (step 406). If the relay link is possible (step 406: Y), the sending station will be acknowledged that the relay link is possible by the use of a format shown in FIG. 5(*d*). However, if the relay link is not possible (step 406: N), it will be judged whether or not there are any other candidates for relay station (step 407). If there are other relay station candidates (step 407: Y), the processing will return to step 404, and relay station addresses other than the previously selected relay station addresses will be selected (step 404). Then, the similar processing will be executed. Relay stations are selected from the candidates on the list until the relay link to the target station becomes feasible, and a relay link request is issued repeatedly. If the relay link becomes possible, the contents of the list will be updated as required (step 408). Then, data are transmitted or received (step 409).

In step 407, if no candidates for relay station are available on the list (step 407: N), a relay station which allows a relay link to the target station will be searched for using a relay station searching method, shown in FIG. 6, which will be described later (step 416). If the relay station is found as a result of the search, and if a relay link is established between the central sending station and the target station (step 417: Y), that relay station will be added to the list (step 418), and data will be transmitted or received (step 409). If no relay station is found (step 417:N), the target station will be stored in the list as a node for which communication is impossible (step 419).

In step 401, if the address of the target station is not on the list (step 401: N), the sending station will issue a direct link request to the target station (step 411). If the direct link is established as a result of this request (step 412: Y), the sending station will add this target station to the list as a node for which direct link is possible (step 413). Then, data will be transmitted or received (step 414). If it is impossible to establish a direct link between the sending station and the target station, the sending station will store the target station in the list as a node for which direct link is impossible (step 415). Thereafter, the same operations as in the case where the address of the relay station is not on the list will be performed.

The sending station transmits data to the target station in the case of the direct link but to the relay station in the case of the relay link using the format shown in FIG. 5(*e*). In the case of the relay link, the relay station automatically relays the data to the target station.

Upon completion of the transmission or receipt of data, the sending station issues an open link request to the relay station (step 410). As will be described later, the relay station opens the link between the sending station and the target station in response to the open link request from the sending station. Then, a response is issued back to the sending station. Upon receipt of the response, the sending station opens the link between the sending station and the relay station.

The above-mentioned operations are carried out every time the sending station sends data to a target station. Particularly when the power-line data transmission system boots up, attempts are made to establish communications with all the nodes connected to the electric power line, whereby a communication possible/impossible list is created for all the nodes. The creation of such a list makes it possible to reduce the frequency of searching of new relay stations. If the list is stored into an nonvolatile read-only memory such as an EEPROM or a backup RAM, it will become unnecessary to prepare the list again when the system re-boots up once the power has been turned off.

Figure 6:
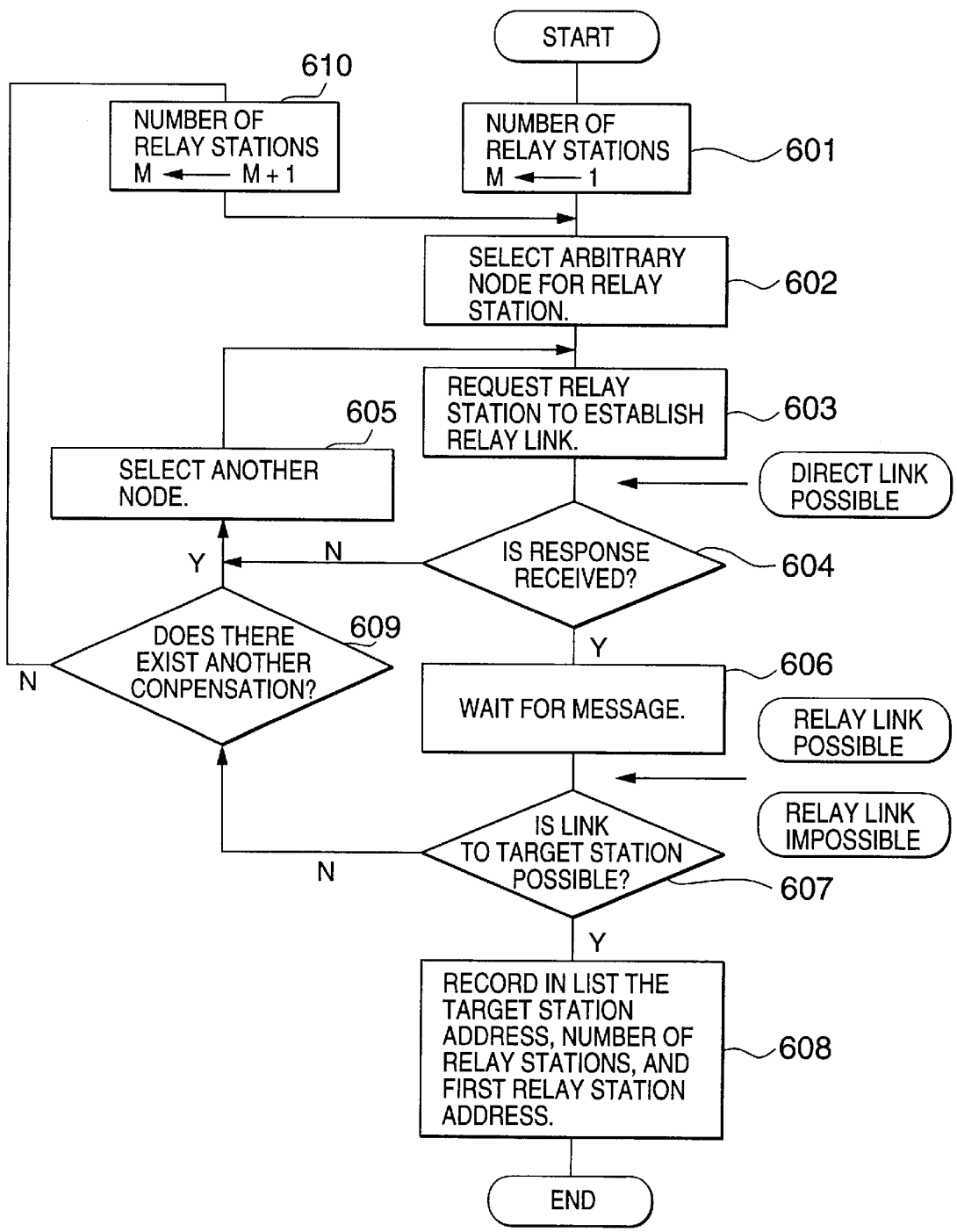
FIG. 6 is a flow chart showing processing operations to search for a relay station.

With reference to FIG. 6, the previously mentioned relay station searching method of the sending station will now be described.

As shown in FIG. 6, if the relay link is not established between the target station and the sending station as a result of the use of only one relay station, a relay link will be established according to this method by increasing the number of relay stations between the sending station and the target station and carrying out double or triple relay operations. Specifically, the following operations will be carried out.

To begin with, the sending station sets the number M of relay stations to one (step 601), and arbitrarily selects one node from among nodes (step 602). A request for a relay link to the target station is then issued to a relay station of the selected node from the sending station using a format such as shown in FIG. 5(c) (step 603).

Upon receipt of the relay link request from the sending station, the relay station of the selected node responds to the sending station by transmitting, to the sending station, the message that communications with the sending station are feasible by the use of the format shown in FIG. 5(b) in order to demonstrate that the selected node itself can communicate with the sending station.

The sending station judges whether or not the message that communication is possible is received (step 604). If the message that communication is possible is not received (step 604: N), the sending station will judge the selected station as being impossible to communicate and re-select a relay station at another node (step 605). The processing returns to step 603, and the same processing as previously mentioned is executed. However, if the message that communication is possible is received from the selected station (step 604: Y), the sending station will wait for a message from the relay station (step 606).

The relay station makes an attempt to decide whether or not a relay link is established between the relay station and the target station in the manner as will be described later (step 607). If the relay link is established between the relay station and the target station (step 607: Y), the message that a relay link in the format shown in FIG. 5(d) is possible will be sent to the sending station.

The sending station that received the relay link possible message stores the target station address, the number of relay stations used between the sending station and the target station, and a first relay station address (the node to which the sending station issued the relay link request) in the list (step 608).

In step 607, if the relay station fails to establish a link with the target station (step 607: N), the message that the relay link is impossible will be issued from that relay station to the sending station.

The sending station then judges whether or no there remain other nodes for which communication is possible (step 609). A node is arbitrarily selected from among the remaining nodes for which communication is possible (step 605), the processing returns to step 603. The same processing as previously mentioned is carried out. However, if there are no other nodes for which communication is possible (step 609: N), the number M of relay stations will be increased to two by addition of one (step 610). Control returns to step 602, and the same processing as previously mentioned is executed.

In this way, the number M of relay stations is incremented one by one until the relay link is established. Details of a double or triple relay will be later explained in the section "operation of the relay station."

According to the previously mentioned relay station searching method executed at the relay station, the number M of relay stations is fixed the number of relay stations indicated by the sending station or a relay station one before that relay station, and the number of relay stations is not increased. An instruction for increasing the number of relay stations is completely controlled by the sending station.

Figure 7A:
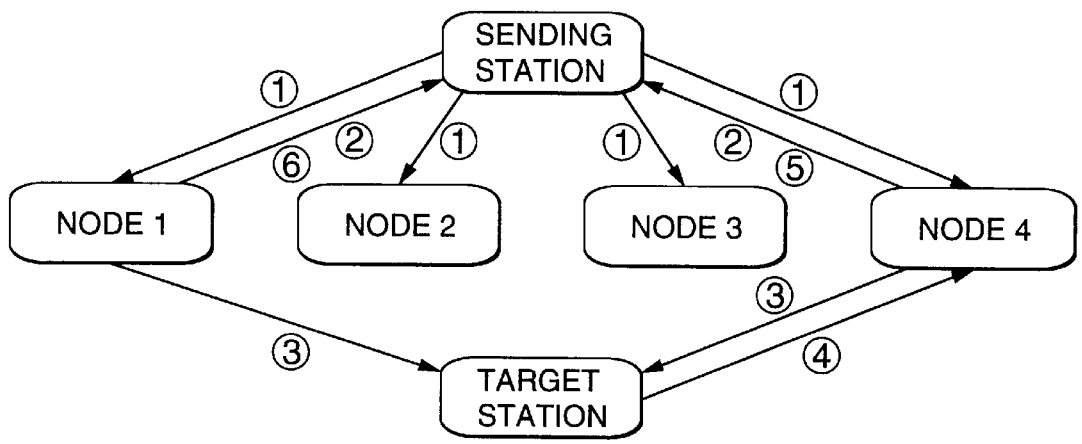
FIGS. 7A and 7B are block diagrams showing processing operations to search for a relay station using simultaneous multiple addressing.
Figure 7B:
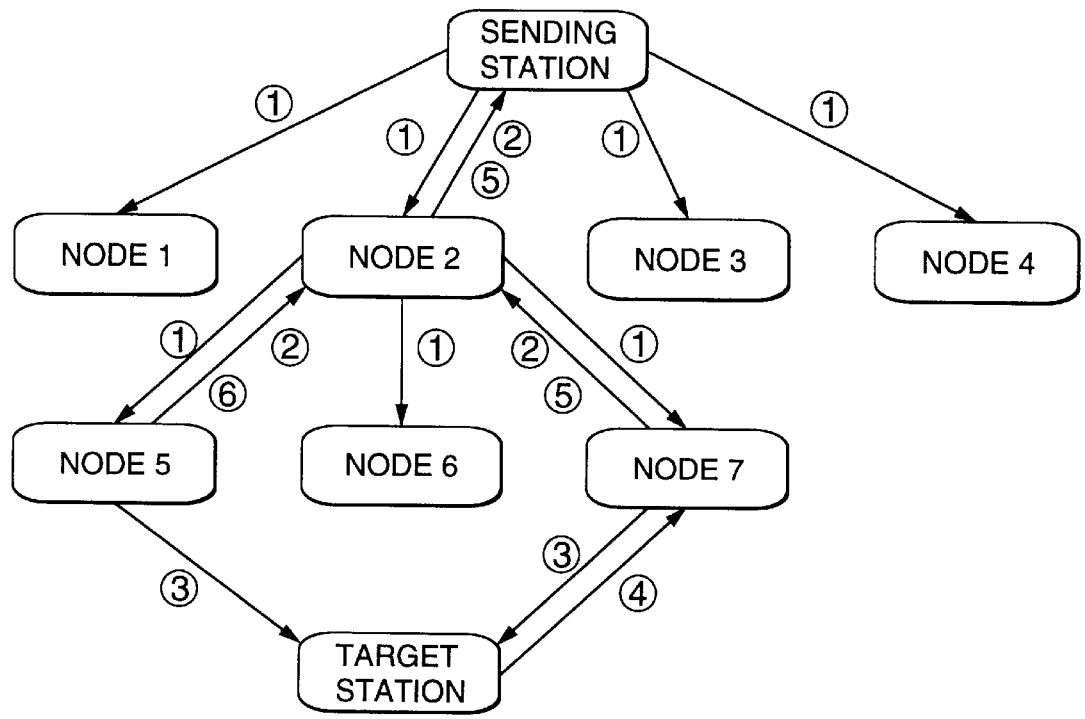

With reference to FIGS. 7A and 7B, a relay station searching method using simultaneous multiple addressing will now be described.

According to the previously mentioned relay station searching method, the sending station searches for a relay station for one node. However, it is also possible to search for the relay stations at one time using simultaneous multiple addressing.

The sending station sets the number M of relay stations to one, and issues a relay link request ((1) in FIGS. 7A and 7B) to all nodes other than itself (that is, nodes 1 through 4 in the drawing) using the format of FIG. 5(c), to find relay stations capable of communicating with a target station.

In order to demonstrate that the nodes can directly communicate with the sending station, the nodes that received the relay link request by simultaneous multiple addressing send back to the sending station the message that direct link in the format shown in FIG. 5(b) is possible ((2) in FIGS. 7A and 7B). However, to avoid a collision between the messages, each node waits for a random period of time, and sends this response back to the sending station after having made certain no response is transmitted from the other nodes.

The sending station judges the node from which the response was obtained as being possible to carry out direct communication. The node is then stored into the direct link possible/impossible area 232 of the list as being possible to effect direct communication (indicated by o in the drawings). The sending station then waits for a subsequent message.

The relay station which sent back to the sending station the message that the relay station can make a direct link attempts to establish a relay link between that relay station and the target station ((3) in FIGS. 7A and 7B). When the message that link is possible is received from the target station as a result of the attempt ((4) in FIGS. 7A and 7B), this relay station sends the sending station the message that a relay link can be established between the target station and the relay station using the format shown in FIG. 5(d) ((5) in FIGS. 7A and 7B). If the relay link is impossible, the message that the relay link is impossible is sent to the sending station ((6) in FIGS. 7A and 7B).

When the sending station received the message the relay link is impossible from every node for which direct communication is possible, the number M of relay stations is increased to two by the addition of one, and a relay link request is issued to the target station following the same procedures. The number M of relay stations is increased one by one until the relay link is established, and the relay link request is issued repeatedly. Details of the double or triple relay will be described in the section "operation of the relay station."

The above mentioned processing are then carried out. When the message the relay link is possible is received from any one of the nodes, the sending station stores the target station address, the number of relay stations provided between the target station and the relay stations, and a node address of the relay station, in the target address area 231, the number-of-relay-station area 234, and the relay address area 235 in the list, respectively.

Figure 8:
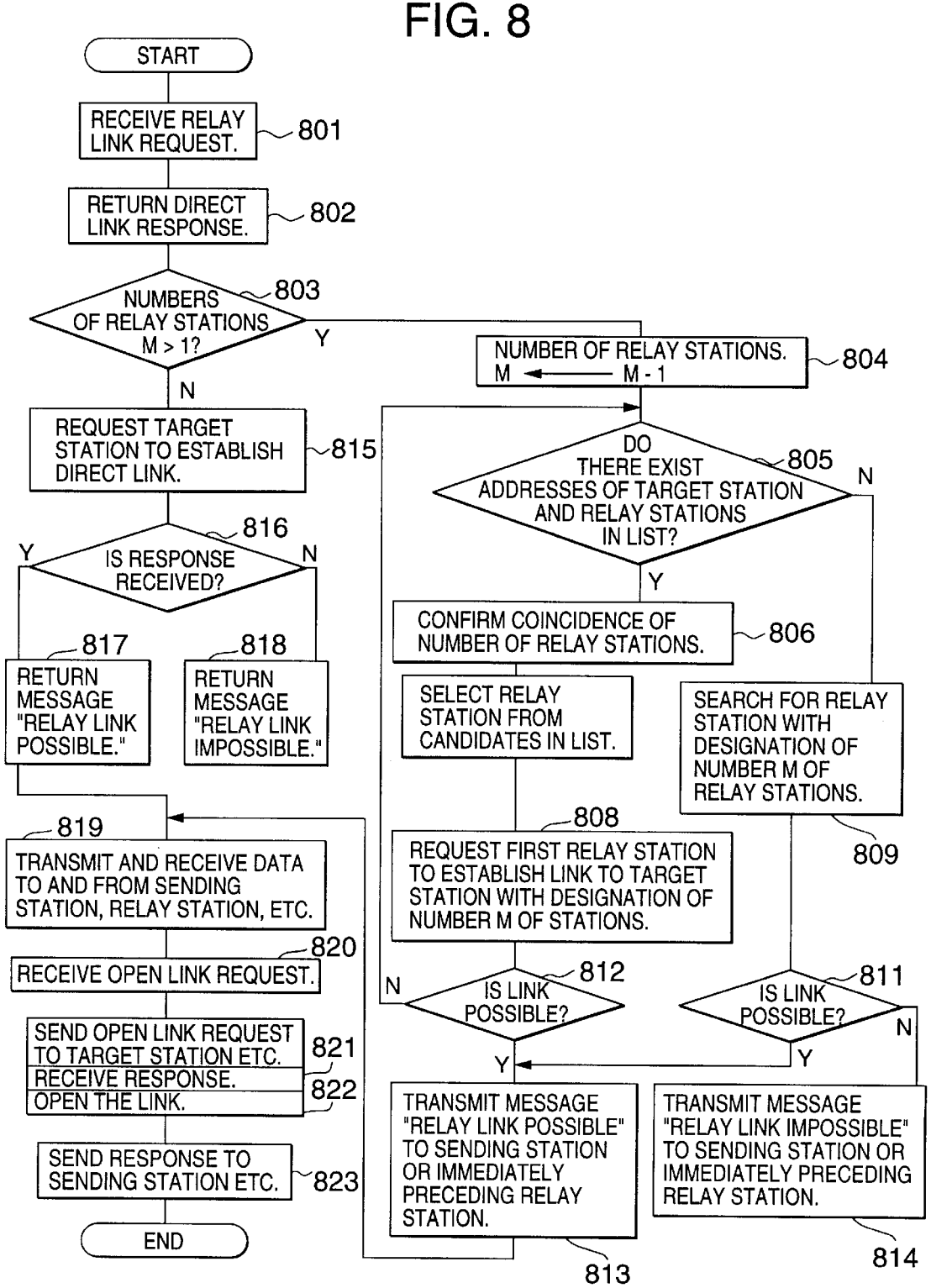
FIG. 8 is a flow chart showing processing operations of a relay station.

The operation of the relay station will now be described with reference to FIG. 8.

The sending station or a relay station one before its own station sends a relay link request in the format as shown in FIG. 5(*c*) to its own station (step 801).

In order to demonstrate that its own station can communicate with the sending station or the like, the relay station that received the relay link request sends back to the sending station the message that the direct link in the format shown in FIG. 5(*b*) is possible (step 802). An attempt is made to establish a relay link with the target station in the manner as will be described below.

The current relay station judges whether or not the number M of relay stations included in the "relay link request" is greater than one (step 803). If the number M of relay stations is greater than one (M>1) (step 803: Y), one or more relay stations will be present between the current relay station and the target station. It is necessary for its own station to instruct the next relay station to issue a direct link with the target station. For this reason, the following operations will be carried out.

The current relay station subtracts one from the number M of the relay stations (M=M−1) which is instructed to the next relay station (step 804), and the current relay station checks whether or not the address of the target station and the address of a relay station are included in its list (step 805). If the target station address and the relay station address are on the list (step 805: Y), its own station will check whether or not the number of station matches with the number M (step 806). Then, the current station selects the next relay station from among the candidates on the list (step 807). A relay link request is issued to the target station via the selected relay station (step 808).

In step 805, if neither the target station address nor the relay station address is included in the list (step 805: N), the message "relay link is impossible" is sent back to the sending station from the relay station. The relay station searches the list, and finds the next relay station which can establish a relay link to the target station (step 809). Here, the relay station searches for the next relay station by specifying the number of relay stations subsequent to its own station.

The relay station judges whether or not it is possible to make a link to the relay stations determined by the search. subsequent to its own station (step 811). If the link to the relay stations subsequent to the its own relay station is possible (step 811: Y), the relay station will send the message "a relay link is possible" to the sending station or the relay station one before its own station (step 814). In the latter case, the link to the sending station or the like is opened.

In step 803, if the number M of relay stations is not greater than one (M≦1) (step 803: N), its own station will be the final relay station and hence have to establish a direct link with respect to the target station. For this reason, that station issues a direct link request to the target station (step 815) and checks whether or not a response is sent back from this target station (step 816).

If no response is sent from the target station (step 816: N), the relay station will send the message "the relay link is impossible" in the format shown in FIG. 5(*d*) back to the sending station or the immediately preceding relay station (step 818). Thereafter, the link to the sending station or the like is opened.

On the other hand, if a response is sent back from the target station (step 816: Y), the relay station will send the message "the relay link is possible" in the format shown in FIG. 5(*d*) to the sending station or the relay station one before its own station (step 817).

The sending station, or the like, sends transmission data to the target station in a format shown in FIG. 5(*e*) by way of the relay stations. The relay station that received the transmission data sends the data to the target station or the next relay station (step 819).

Upon completion of the transmission or receipt of the data, the sending station issues an "open link request" to the relay station (step 820).

The relay station that received the "open link request" also issues the "open link request" to the target station or the next relay station, and waits for a response from the target station or the next relay station (step 821).

The relay station that received an "open link response" from the target station or the next relay station in response to the "open link request" opens the link to the target station or the next relay station (step 822), and sends back the "open link response" to the sending station or the relay station one before its own station (step 823).

Upon receipt of the response, the sending station opens the link to the relay station.

A double or triple relay link via a plurality of relay stations can be realized by carrying out the above mentioned operations. It is sufficient for the sending station or each of the relay stations to know an address of a relay station to which the sending station or the relay station has to effect transmission next time and the number of relay stations which will be necessary later. It is unnecessary for the sending station or each of the relay stations to know all relay station addresses.

Figure 9:
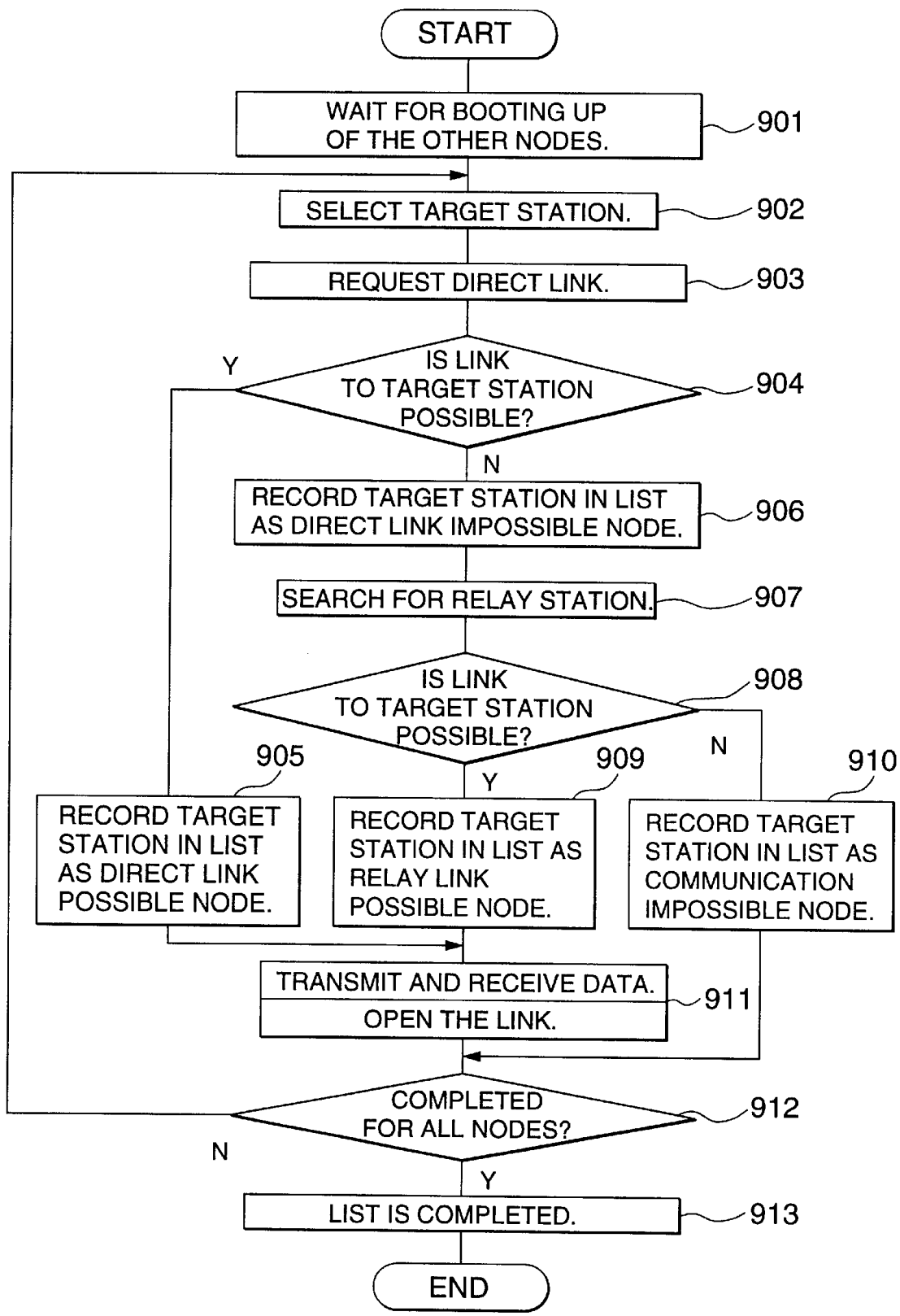
FIG. 9 is a flow chart showing processing operations to search for a relay station when the system boots up and to prepare a communications node list.
Figure 10:
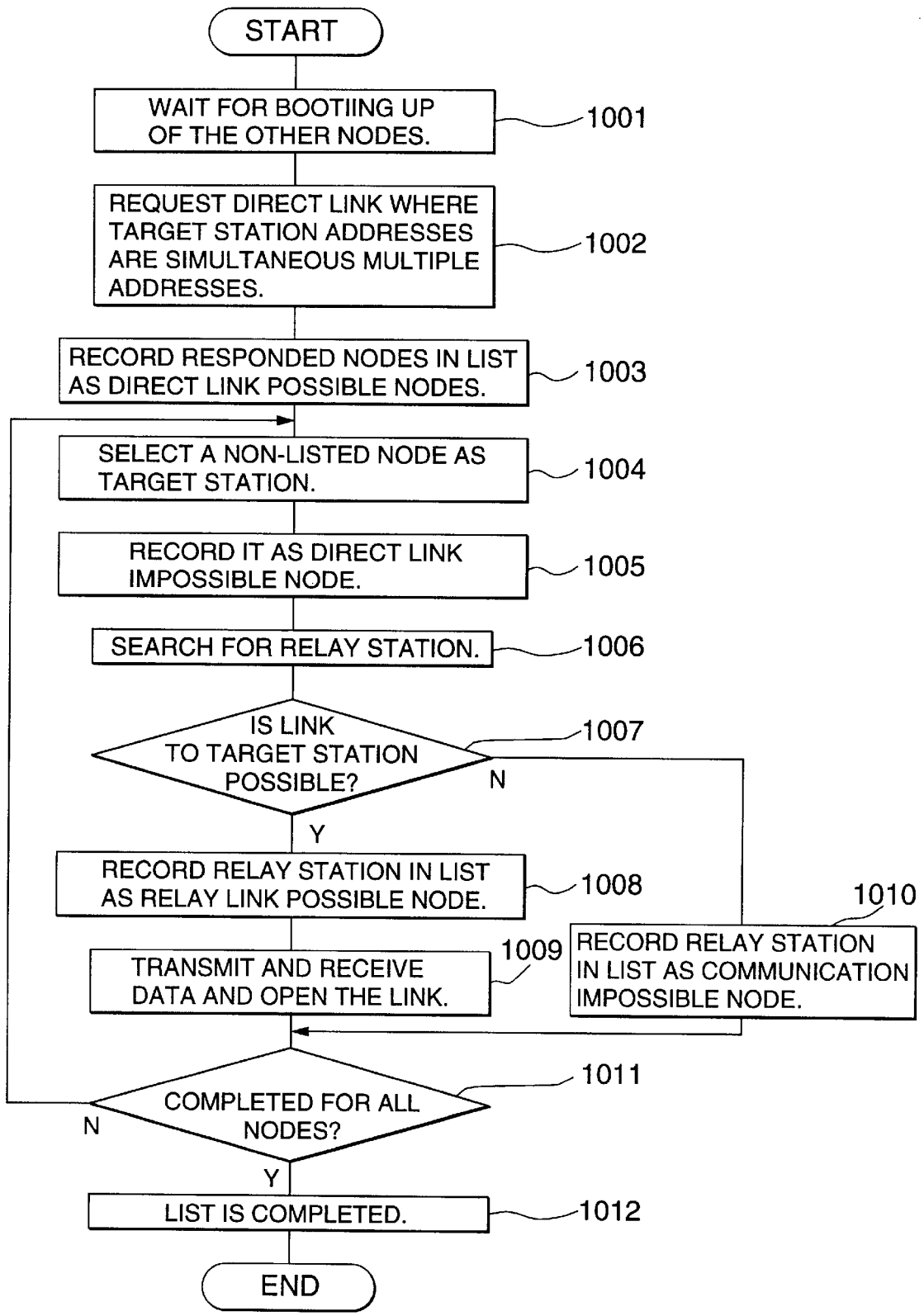
FIG. 10 is a flow chart showing processing operations to search for a relay station when the system boots up and to prepare a communications node list.

The operations relating to relay stations and the preparation of a list when the system boots up will now be described with reference to FIGS. 9 and 10.

After nodes have been powered, the sending station waits for a certain period of time. After that, the sending station searches for relay stations and prepares a list. Procedures of these operations will now be described. The following description is based on the assumption that each node is previously given the address of each node connected to an electric power line.

To begin with, the sending station waits for all nodes to boot up after the nodes have been powered (step 901). The sending station selects an arbitrary target station (step 902) and sends a direct link request to the selected target station (step 903). The sending station then checks whether or not a link to the target station can be established (step 904). If a direct link to the target station is possible (step 904: Y), the target station will be stored in the list as a node for which a direct link is possible (step 905). Control of the procedures is then shifted to step 911 which will be described later. If the direct link is impossible (step 904: N), the target station will be stored in the list as a node for which the direct link is impossible (step 906). The sending station searches for another relay station capable of establishing a link to the target station on the basis of the previously mentioned "relay station searching method" (step 907).

If the relay station is found as a result of the search of a relay station capable of establishing a relay link to the target station, and if the relay link to the target link can be established (step 908: Y), the sending station will store in the list the address of that relay station, the number of relay stations required between the sending station and the target station, and information about a time zone (step 909). However, if the relay station is not found (step 908: N), the target station will be stored in the list as a node for which communication is impossible (step 910), and the control of the processing will be shifted to step 912 which will be described later.

In step 911, the sending station transmits data as required and opens the link. The sending station then judges whether or not all of the nodes were stored in the list (step 912). If all of the nodes are not stored in the list (step 912: N), the control of the procedures will return to step 902. The same processing as previously described is carried out. If all of the nodes are stored in the list (step 912: Y), the preparation of the list will be completed (step 913).

By using simultaneous multiple addressing, it is easy to prepare a list of nodes for which direct communication is possible when the system boots up by the use of simultaneous multiple addressing. This method will be described with reference to FIG. 10.

To begin with, the sending station waits for all of the nodes to boot up after the nodes have been powered (step 1001). After all of the nodes have booted up, the sending station issues a direct link request to all the nodes where target addresses are simultaneous multiple addresses (step 1002).

In order to demonstrate that the nodes received the request can directly communicate with the sending station, each node capable of directly communicating with the sending station which received the direct link request sends back the message "the direct link is possible" in the format shown in FIG. 4(*b*) to the sending station.

The sending station judges the node from which the message is received as a node for which direct communication is possible, and stores that node in the list (step 1003). As a result of this, the preparation of the list of nodes for which direction communication is possible is completed.

The sending station selects a node not included in the list as a target station (step 1004), and stores the selected node as a node for which direct communication is impossible (step 1005). Subsequently, the sending station searches for a relay station capable of establishing a relay link to the target station (step 1007) based on the previously mentioned "relay station searching method" (step 1006).

If the relay station is found as a result of the search of the relay station capable of establishing a relay link to the target station, and if the relay link to the target station can be established (step 1007: Y), the sending station will store the address of the relay station, the number of relay stations required between the sending station and the target station, and information about a time zone in the list (step 1008). If the relay station is not found (step 1007: N), the target station will be stored in the list as a node for which communication is impossible (step 1010). Then, the control of the procedures will be shifted to step 1011.

In step 1009, the sending station transmits data as required and opens the link. The sending station then judges whether or not all of the nodes were stored in the list (step 1011). If all of the nodes are not stored in the list (step 1011: N), the control of the procedures will return to step 1004. The same processing as previously described is carried out. If all of the nodes are stored in the list (step 1011: Y), the preparation of the list will be completed (step 1012). Now, the preparation of all nodes is finished.

With regard to the preparation of the list according to this method when the nodes boot up, it is also possible to prepare only a list of nodes for which direct link is possible. Nodes for which direct link is impossible are described in the relay station search list when it becomes necessary to carry out communication with these nodes.

The operation of the power-line data transmission system in this embodiment will be more specifically described with reference to FIGS. 11A–11E and FIGS. 12A–12C.

In this embodiment, five power-line communications devices (hereinafter referred to as a node) (1)–(5) of each data terminal 3 are connected to the electric power line 1. An explanation will be given of the case where the node (1) carries out transmission based on the assumption that the node (1) can communicate with the nodes (2), (3), and (4) and the node (5) can communicate with the nodes (3) and (4). Here, nothing is stored in a list.

1) Transmission from node (1) to node (5):

The node (1), serving as a sending station, searches a list stored in the list storage unit 23 and issues a direct link request (see FIG. 5(*a*)) to the node (5) because the node (5), serving as a target station, is not included in the target station address area 231. No response is obtained from the node (5) because the nodes (1) and (5) cannot communicate with each other (see FIG. 11A).

For this reason, the node (1) recognizes the node (5), i.e., the target station as being impossible to communicate, and stores the node (5) as a node for which direct link is impossible in the direct link possible/impossible area 232 of the list (designated by x in FIG. 3).

Then, the node (1), serving as the sending station, searches for a relay station for the target station node (5). The number M of relay stations is set to one with respect to the number-of-relay station area 234 in the list which corresponds to the node (5). The node (2) is arbitrarily selected from among the nodes (2), (3), and (4) which can communicate with the sending station. The sending station sends a message of "request for a relay link to the node (5)" to the node 2 which serves as a relay station (see FIGS. 11B (1)).

Figure 11A:
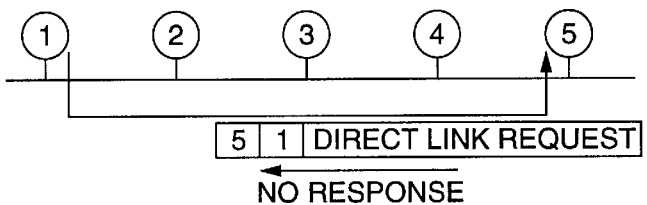
FIGS. 11A through 11E are explanatory views specifically illustrating a relay method.
Figure 11B:
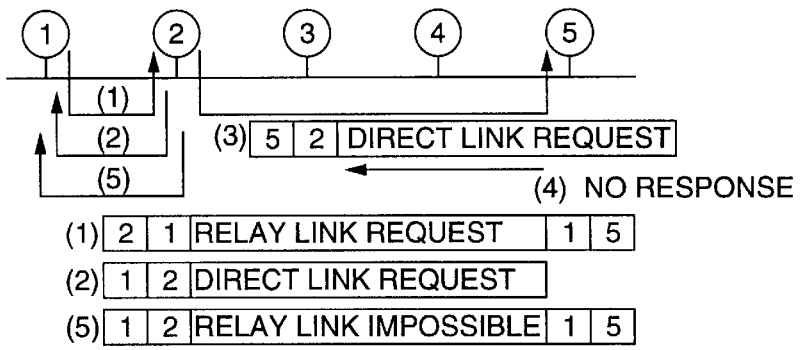

The relay station node (2) that received the message sends a message of "direct link response" back to the sending station node (1), and thereafter sends the message of "relay link request" to the node (5) (see FIGS. 11B, (2) and (3)). However, the nodes (2) and (5) cannot communicate with each other, no response is obtained from the node (5). Hence, the relay station node (5) sends to the sending station (1) the message that the relay link is impossible (see FIG. 11B (4) and (5)).

The node (1) opens the link to the node (2) and selects the node (3) as the next node from among the nodes (3) and (4) both of which are arbitrarily selectable. The sending station then requests the node (3) to establish a relay link to the node (5) (see FIG. 11C (1)).

Figure 11C:
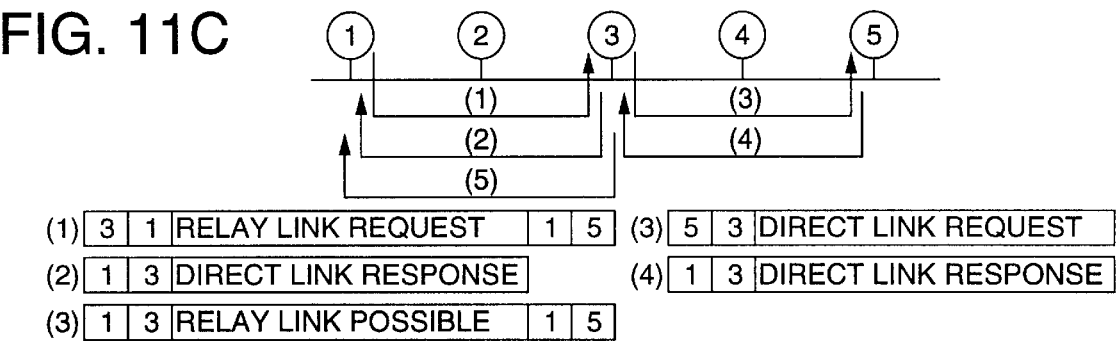
Figure 11D:
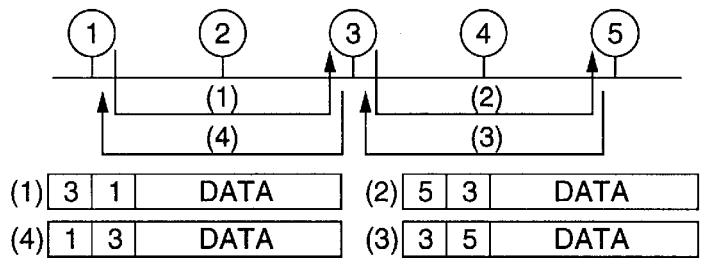
Figure 11E:
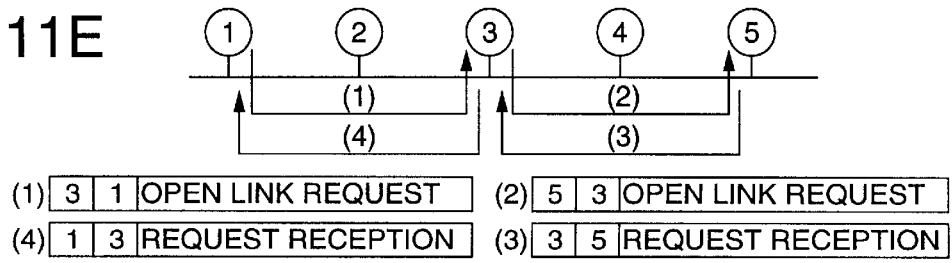

The relay station node (3) sends back to the node (1) the message that the nodes (1) and (3) can be linked to each other, and then sends a direct link request to the target station node (2) (see FIG. 11C (2) and (3)). Since the nodes (3) and (5) can communicate with each other, the node (3) receives from the node (5) the message that the direct link is possible. Then, the node (3) sends to the sending station node (1) the message that relay link is possible (see FIG. 11C (4) and (5)).

The sending station node (1) that received the message stores one in the number-of-relay-station area 234 in the list stored in the list storage unit 23; storing the address of the node (2) in the relay station address area 235; storing a time zone, a day of the week, a period of time at the time at that moment in the remark area 236; and storing in the relay station link possible/impossible area 232 the fact that a relay link can be established the nodes (1) and (5).

The sending station node (1) sends the relay station node (3) data which are to be sent to the node (5). Upon receipt of the data from the node (1), the relay station node (3) sends the node (5) the data just as they are. When another data item needs to be sent back to the node (1) in response to the received data, the node (5) sends the relay station (3) data which are sent to the node (1). The node (3) sends the node (1) the data, received from the node (5), as they are (see FIG. 11D).

When the sending station node (1) wants to open the link to the target station node (5), the sending station node sends an open link request to the relay station node (3). Upon receipt of the open link request, the node (3) sends the same open link request to the target station node 5 (see FIG. 11E (1) and (2)). When received the message, the node (5) sends, the message of the receipt of the open link request from the node (3), back to the node (3). Upon receipt of the message, the node (3) opens the link to the node (5), and then sends the node (1) the message of the receipt of the open link request from the node (1) (see FIG. 11E (3) and (4)). Then, the node (1) opens the link to the node (3).

2) Transmission from node (1) to nodes (2), (3), and (4):

All the sending station node (1), and the nodes (2), (3), and (4) can carry out communication, and hence the nodes (2), (3), and (4) which received the direct link request from the node (1) send a message of "direct link response" which represents a direct link to the node (1) back to the node (1) in response to the direct link request.

When the direct link response is received, the sending station node (1) writes the nodes (2), (3), and (4) into the direct link possible/impossible area 232 in the list as a node for which direct link is possible.

3) Re-transmission from node (1) to node (5):

The sending station node (1) searches for the node (5) from the target station address area 231 in the list. The sending station node takes the node (3) as a relay station based on the contents of the list, and issues a relay link request to the node (5) via the node (3) (see FIG. 11C (1)). Upon receipt of the message that the link is possible from the node (5) via the relay station node (3), the node (1) sends the node (5) data.

FIGS. 12A to 12C show the contents stored in the list storage unit 23 with respect to the node (1).

The above descriptions are given of the power-line data transmission system in this embodiment, and an embodiment using this power-line data transmission system according to this invention will now be explained.

Figure 13:
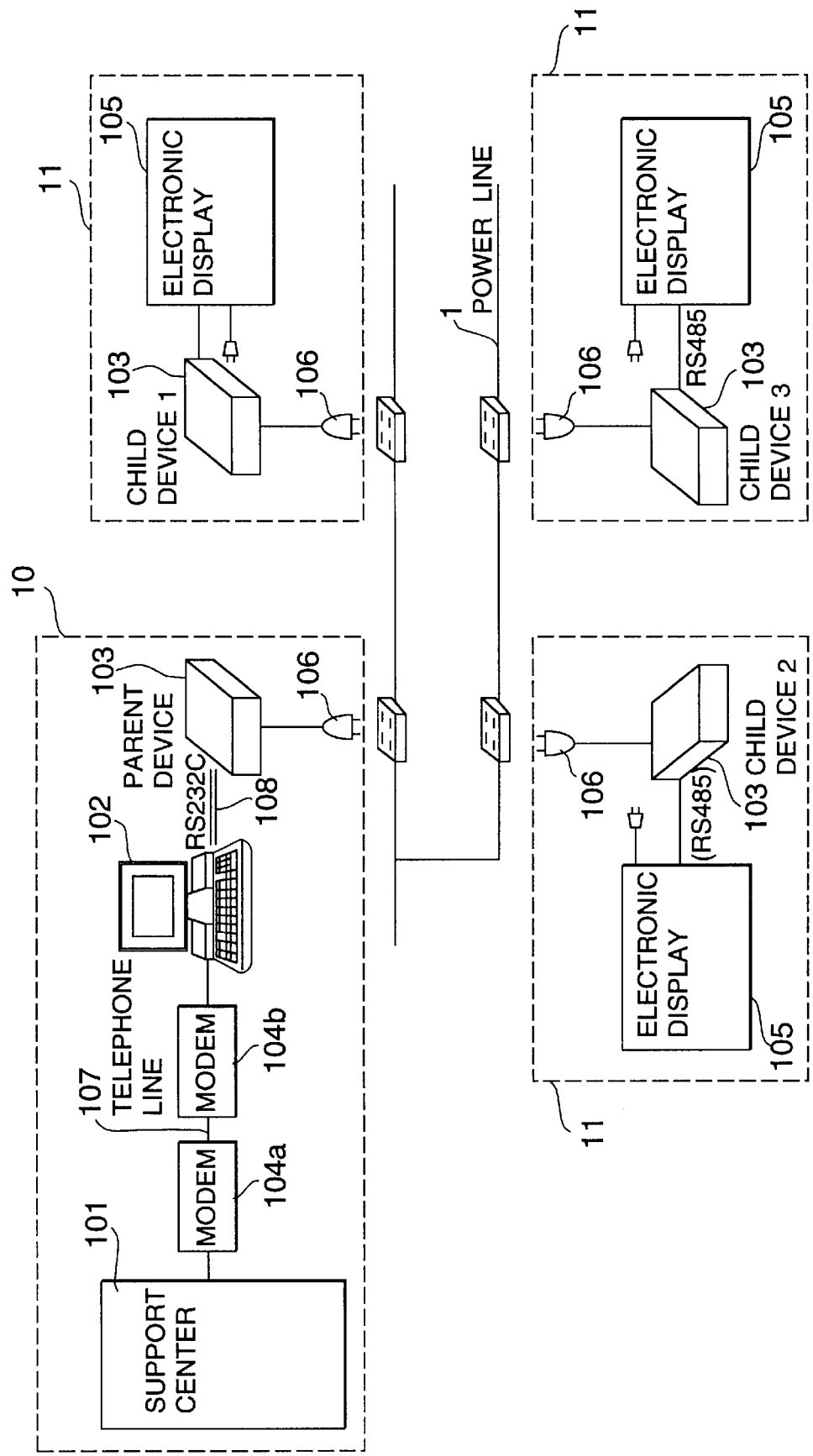
FIG. 13 is a block diagram showing the configuration of a system using a power-line data transmission system in one embodiment of the present invention.

FIG. 13 is a block diagram showing the configuration of one embodiment of an LED display system which uses the power-line data transmission system.

The LED display system is made up of a power line 1, a support unit 10, and a plurality of displays 11.

The support unit 10 includes a support center 101, a PC 102, a power-line communications unit 103, and two modems 104a and 104b connected to a telephone line 107. The support center 101 is connected to the PC 102 via the modem 104a, the telephone line 107, and the modem 104b. The PC 102 is connected to the power-line communications unit 103 via a communication line 108, and the power-line communications unit 103 is connected to the power line 1 via a receptacle 106.

Each of the displays 11 is made up of the power-line communications unit 103 and an electronic display 105. The power-line communications unit 103 is connected to the power line 1 via the receptacle 106.

For example, the electronic display 105 is arranged so as to memorize display data sent from the PC 102 and indicate the display data according to preset procedures.

The support unit 10 may also be adapted to send the display data to be displayed on the electronic display 105 to the PC 102 via the telephone line 107.

When such an LED display system is disposed, for example, at the entrance of a shop, it becomes unnecessary to lay a signal line for use in sending display data which are to be displayed on the electronic display 105. Hence, a wiring cost can be reduced. Moreover, so long as there is the power line 1, it becomes unnecessary to lay the signal line again every time the electronic display 105 is moved. Thus, it is possible to reduce the cost, time, and labor associated with the wiring job. Moreover, it is possible to easily increase or decrease the number of electronic displays 105 without a new wiring job so long as there is the power line 1.

Figure 14:
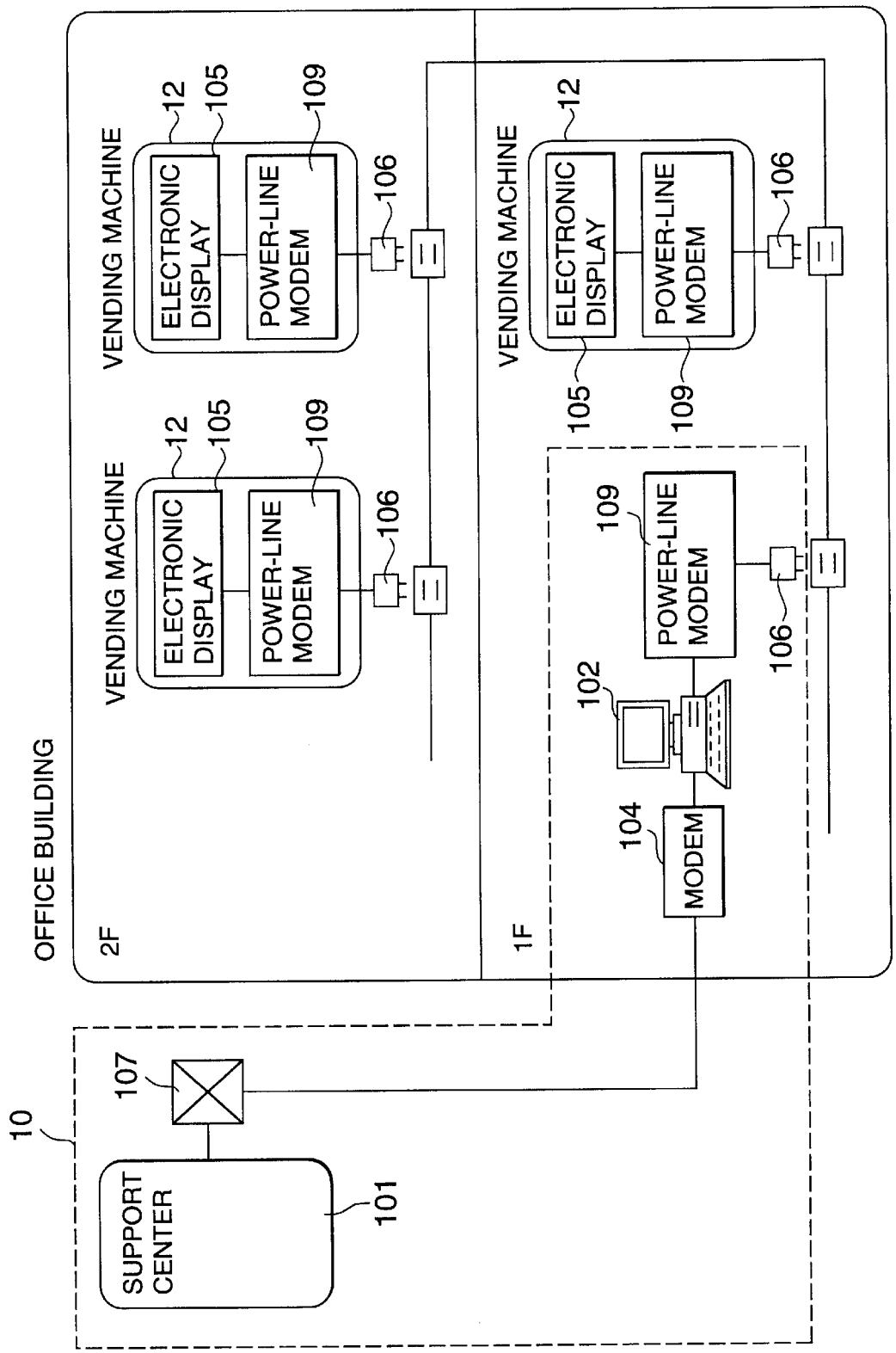
FIG. 14 is a block diagram showing the configuration of a system using a power-line data transmission system in another embodiment of the present invention.

FIG. 14 is a block diagram showing the configuration of one embodiment of the LED display system in which electronic displays are housed in vending machines.

The LED display system is made up of the support unit 10 connected to the power line 1, and a plurality of vending machines 12 connected to the power line 1.

Each of the vending machines 12 includes a power-line modem 109 and the electronic display 105, and the power-line 109 is connected to the power line 1 via the receptacle 106.

The electronic display 105 is arranged so as to store the display data sent from the support center 101 and display the display data according to preset procedures.

Even in this embodiment, as with the previous embodiment, when the vending machine 12 with the electronic display is disposed, it becomes unnecessary to lay a new signal line for use in sending the display data which are to be displayed on the electronic display 105, and hence a wiring cost can be reduced. Moreover, so long as there is the power line 1, it becomes unnecessary to lay the signal line again every time the electronic display 105 is moved. Thus, it is possible to reduce the cost, time, and labor associated with the wiring job. Moreover, it is possible to easily increase or decrease the number of vending machines 12 without a new wiring job so long as there is the power line 1.

Figure 15:
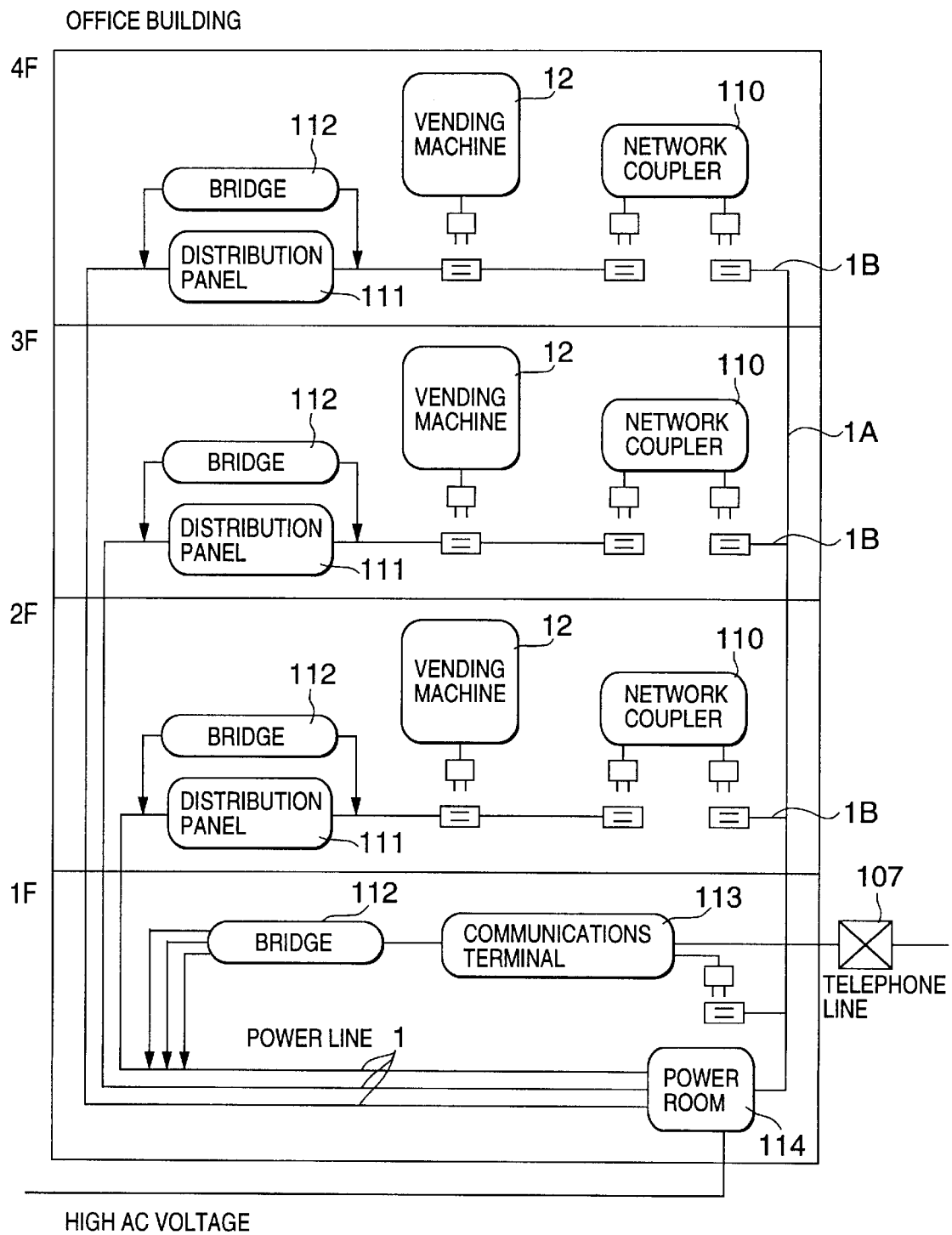
FIG. 15 is a block diagram showing the configuration of a system using a power-line data transmission system in still another embodiment of the present invention.

FIG. 15 is a block diagram showing the configuration of one embodiment in which the electronic displays are housed in the vending machines.

This embodiment exemplary shows the transmission of a signal between floors within an office building and is different from the previous embodiment in that the vending machines 12 are disposed on each floor from the first to fourth floors and the power line 1 for feeding transmission data to the vending machines is distributed via distribution panel 111 each of which is disposed on each floor.

In this embodiment, the power lines 1B disposed on each floor and the power line 1A connecting the power lines 1B are different in phase from each other. Hence, it is impossible to establish communication between the power line 1A and the power lines 1B. For this reason, in this embodiment, network couplers 110 are provided instead of the power line modems 109 so as to let only high frequency waves (signals) more than 100 kHz to pass.

If the transmission data cannot be transmitted by the presence of the distribution panel 111, it would be better to provide bridges 112 across the distribution panel 111 so as to let only the high frequency waves (signals) more than 100 kHz.

It goes without saying that the same results as in the previous embodiments are obtained even in this embodiment because of the use of the power line 1 in the data transmission system.

Embodiments of a container carrier system and a management information collection method therefor, according to the present invention, will now be described in detail hereunder with reference to the accompanying drawings.

Figure 16:
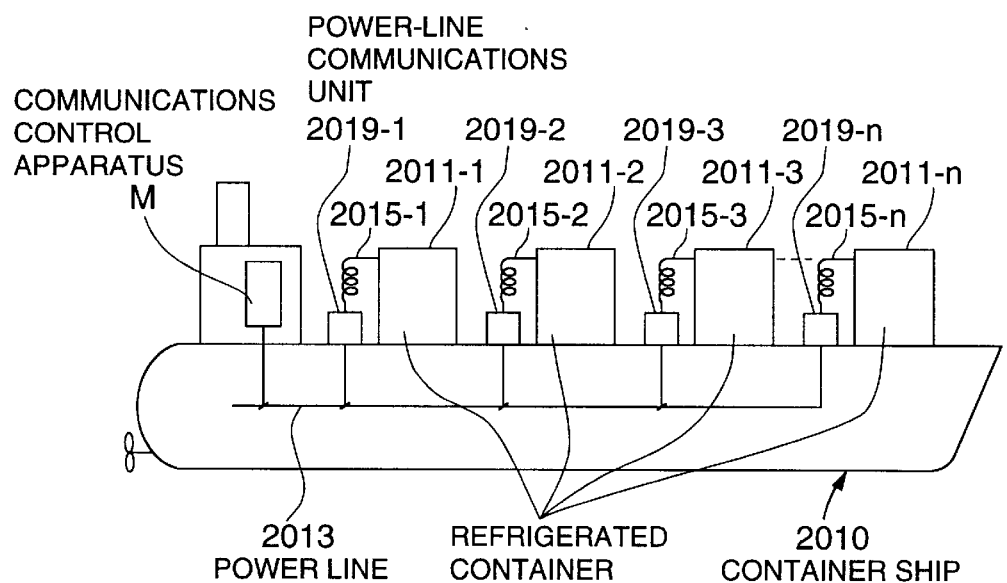
FIG. 16 is an outline schematically showing the configuration of a refrigerated container carrier system in one embodiment of the present invention.

FIG. 16 shows the outline of the configuration of a container carrier system in one embodiment of the present invention. In this embodiment, a container ship 2010 is shown as a container carrier system, and this container carrier ship 2010 carries a plurality of refrigerated containers 2011-1 to 2011-n. In the container ship 2010 in this embodiment, information about the refrigerated containers 2011-1 to 2011-n is collected through a power line 2013 which feeds electric power to each of the refrigerated containers 2011-1 to 2011-n. For the convenience of explanation, the same reference numerals used in FIGS. 28 to 31 are provided to designate the features corresponding to those in the conventional container ship throughout the following drawings.

In FIG. 16, the refrigerated containers 2011-1 to 2011-n are connected to a communications control apparatus M via electric power lines 2015-1 to 2015-n, electric-line communications units 2019-1 to 2019-n, and an electric power line 2013. The communications control apparatus M collects information about each of the refrigerated containers 2011-1 to 2011-n over the electric power line 2013 by power-line communication.

The management information about each of the refrigerated containers 2011-1 to 2011-n comprises 1) refrigerator operation information representing whether or not the refrigerator is in operation;
2) preset temperature excess information representing whether or not the temperature of the inside of the container is in excess of a given preset value; and
3) refrigerator abnormal operation information representing whether or not the refrigerator is in abnormal operation.

Figure 17:
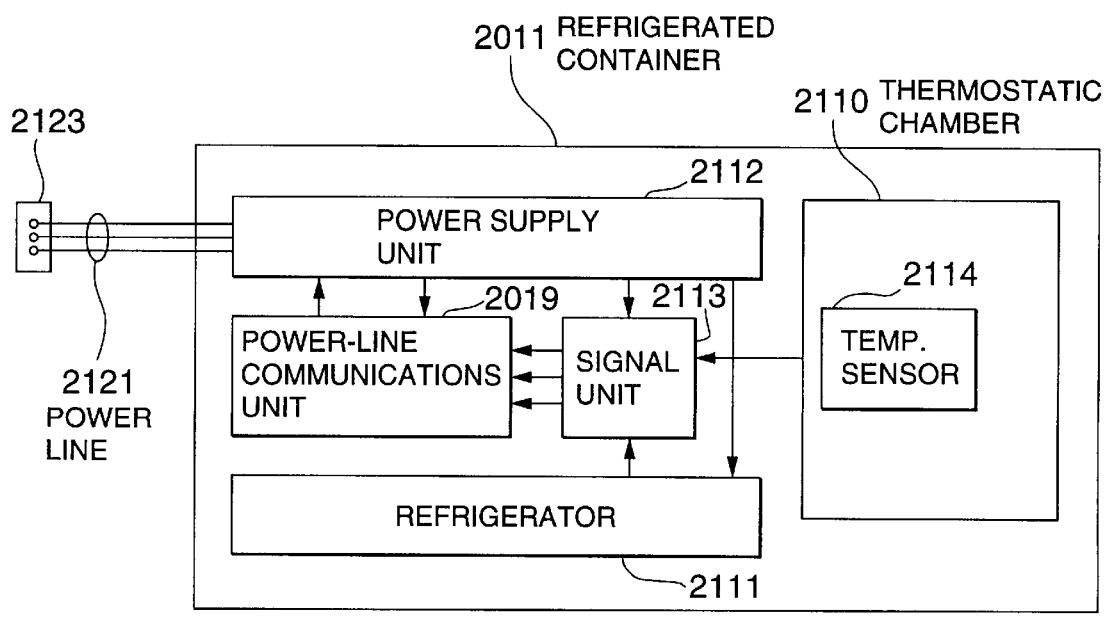
FIG. 17 is a schematic diagram showing the detailed configuration of the refrigerated container carrier system shown in FIG. 16.

FIG. 17 shows the detailed configuration of each of the refrigerated containers 2011-1 to 2011-n shown in FIG. 16. The refrigerated container shown in FIG. 17 comprises a thermostatic chamber 2110, a refrigerator 2111, a power supply unit 2112, a signal unit 2113, a temperature sensor 2114, and the power-line communications unit 2019.

Figure 29:
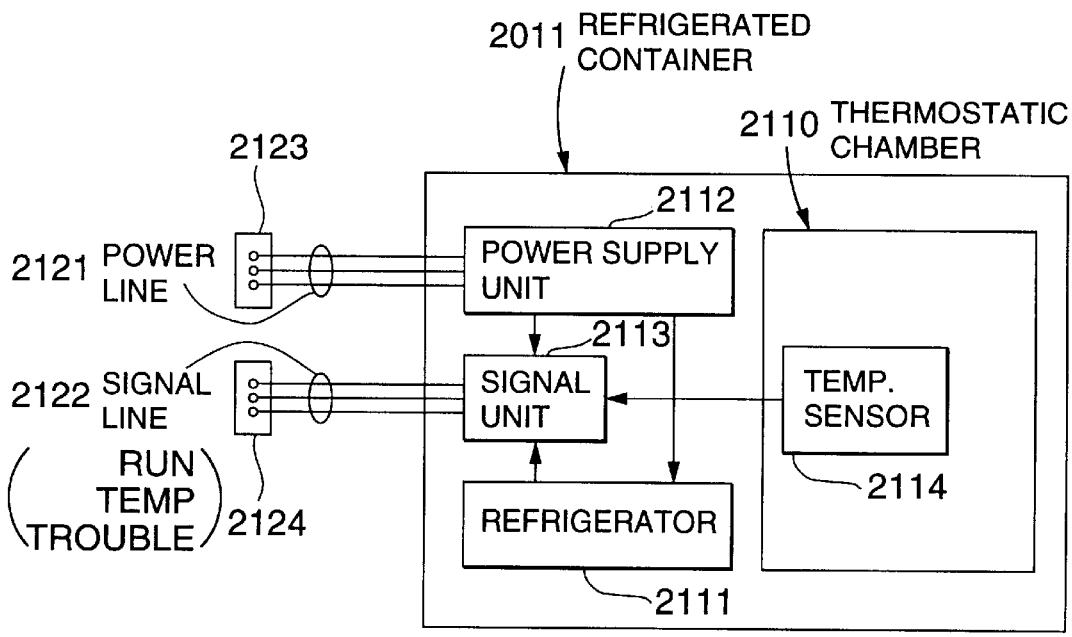
FIG. 29 is a schematic diagram showing the detailed configuration of the refrigerated container ship shown in FIG. 28.
Figure 30:
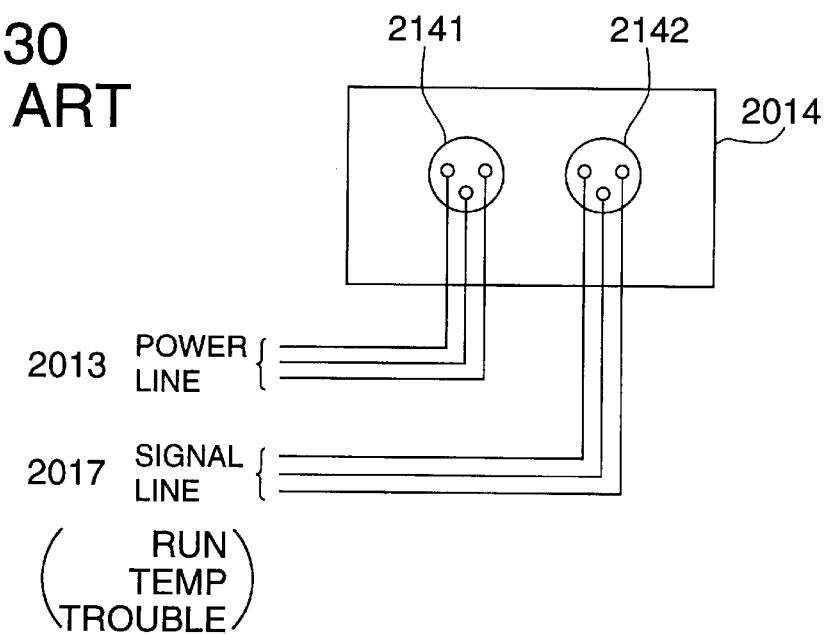
FIG. 30 is a schematic diagram showing the detailed configuration of a signal box shown in FIG. 28.

The refrigerated container is the same as the refrigerated container 2011 shown in FIG. 29 except for the power-line communications unit 2019. The configuration shown in FIG. 17 does not include the signal line 2122 over which the RUN, TEMP, and TROUBLE signals shown in FIG. 29 are transmitted and the signal receptacle 2124. Only the power supply unit 2112 is connected to the power supply plug 2123 via the three-phase, 440 V, electric power line 2121.

In addition to the configuration shown in FIG. 29, the configuration shown in FIG. 17 includes the power-line communications unit 2019 mutually connected to the power supply unit 2112, and the power-line communications unit 2019 receives 1) a refrigerator operation signal RUM representing that the refrigerator 2111 is in operation;
2) a preset temperature excess signal TEMP representing that the temperature of the inside of the thermostatic chamber 2110 is in excess of a preset temperature; and
3) a refrigerator abnormal operation signal TROUBLE representing that the refrigerator 2111 is in abnormal operation.

The power-line communications unit 2019 carries out power-line communication between the communications control apparatus M and the electric power line 2013, both being shown in FIG. 16. Moreover, the power-line communications unit 2019 effects power-line communication between the power-line communications unit 2019 of another refrigerated container and the electric power line 2013.

The power-line communications unit 2019 shown in FIG. 17 is shown as the power-line communications units 2019-1 to 2019-n in FIG. 16.

Figure 18:
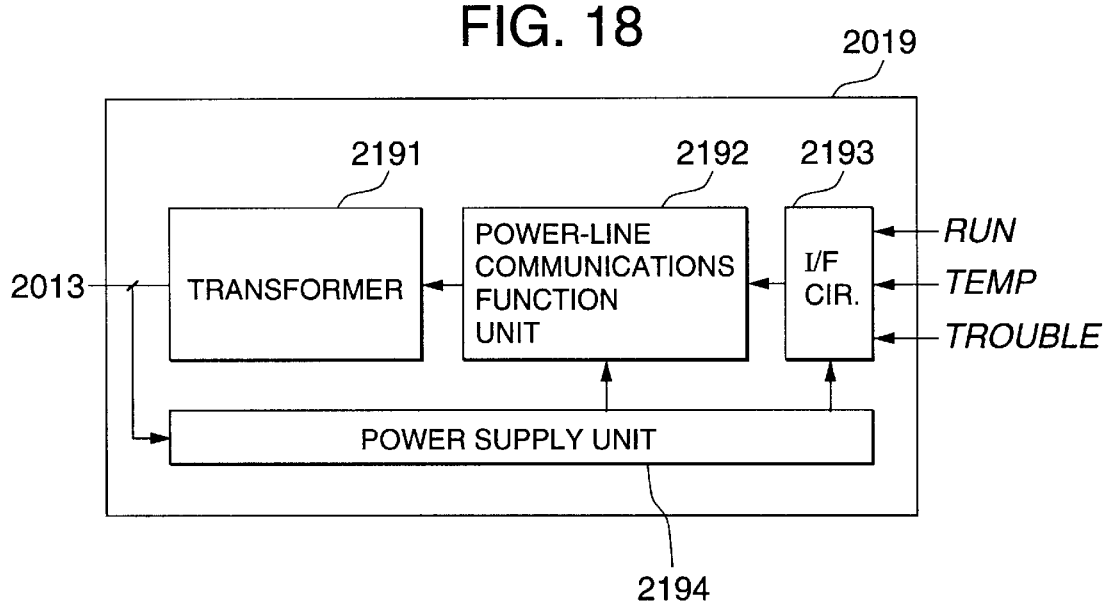
FIG. 18 is a schematic diagram showing the detailed configuration of a power-line communications unit shown in FIG. 17.

FIG. 18 shows the detailed configuration of the power-line communications unit 2019 shown in FIG. 17. This power-line communications unit 2019 is provided with a transformer 2191, a power-line communications function unit 2192, an interface circuit 2193, and a power supply unit 2194.

The transformer 2191 is connected to the electric power line 2013 shown in FIG. 16 and lets high frequency signals over 100 kHz to selectively pass.

The power-line communications function unit 2192 effects power-line communication over the electric power line 2013 between the power-line communications function unit 2192 and the communications control apparatus M shown in FIG. 16, and also carries out power-line communication over the electric power line 2013 between the power-line communications function unit 2192 and the power-line communications unit 2019 of another refrigerated container. This power-line communications function unit 2192 converts data, corresponding to the refrigerator operation signal RUN, the preset temperature excess signal TEMP, and the refrigerator abnormal function signal TROUBLE fetched from the signal unit 2111 via the interface circuit 2193, to a frequency signal more than 100 kHz which can be superimposed on the electric power line 2013. The data are transmitted to the electric power line 2013 via the transformer 2191.

The interface circuit 2193 serves as an interface to the refrigerator operation signal RUN, the preset temperature excess signal TEMP, and the refrigerator abnormal function signal TROUBLE fed from the signal unit 2113.

The power supply unit 2194 is connected to the electric power line 2013, and generates electric power to be fed to the power-line communications function unit 2192 based on the electric power from the electric power line 2013.

Figure 19:
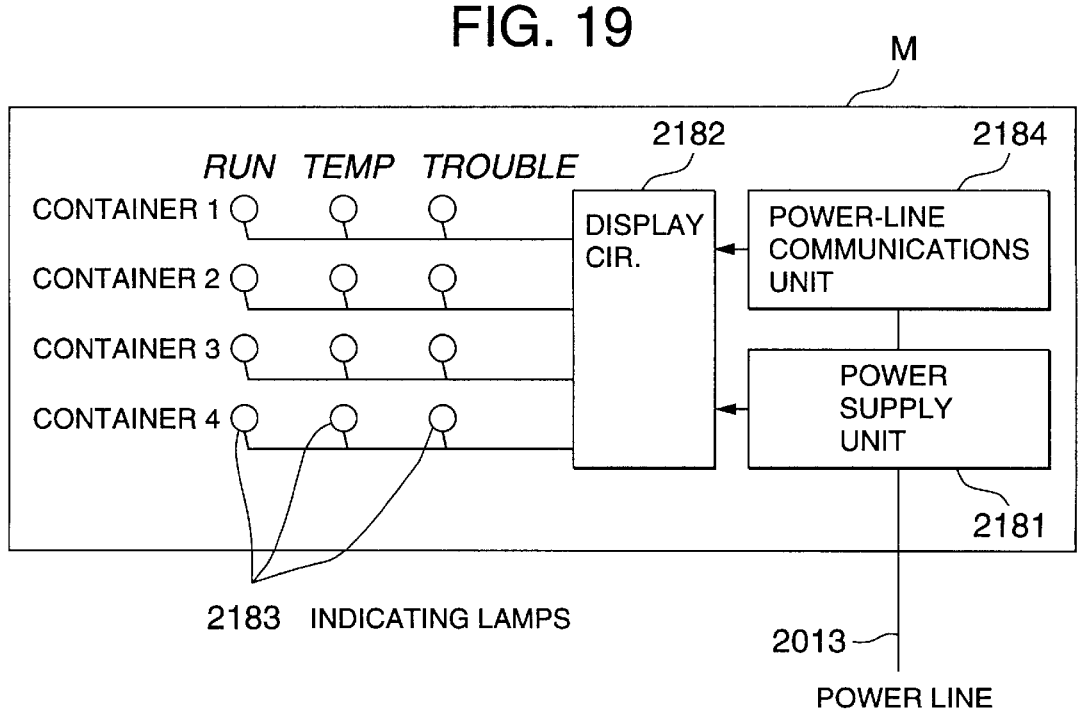
FIG. 19 is a schematic diagram showing the detailed configuration of a communications management device shown in FIG. 16.

FIG. 19 shows the detailed construction of the communications control apparatus M shown in FIG. 16. This communications control apparatus M corresponds to the signal display panel 2018 shown in FIG. 31, and is made up of a power supply unit 2181, a display circuit 2182, a plurality of indicating lamps 2183, and a power-line communications unit 2184.

Figure 31:
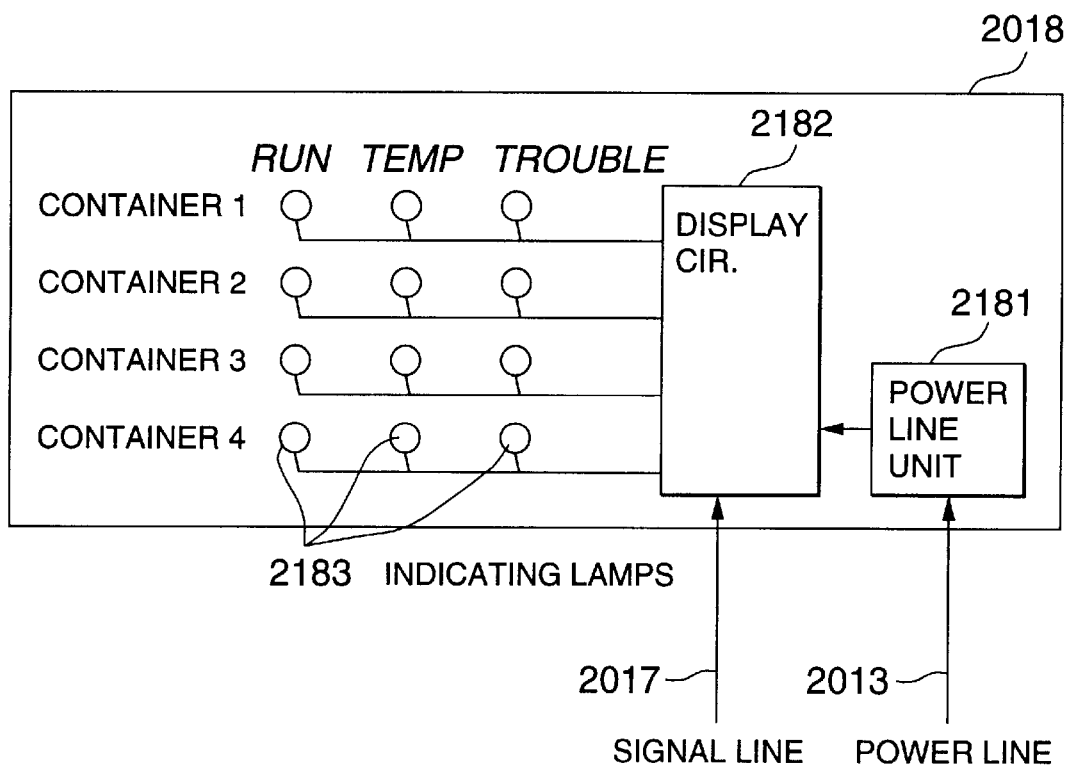
FIG. 31 is a schematic diagram showing the detailed configuration of a signal display panel shown in FIG. 28.

The communications control apparatus M is the same as the signal display panel 2018 shown in FIG. 31 except for the power-line communications unit 2184. The configuration shown in FIG. 19 does not include the signal line 2017 to be connected to the display circuit 2182, but is provided with the power-line communications unit 2184 instead of the signal line 2017. This power-line communications unit 2184 collects the refrigerator operation information, the preset temperature excess information, and the refrigerator abnormal function information from each of the refrigerated containers 2011-1 to 2011-n utilizing power-line communication via the electric line 2013. These information items thus collected by the power-line communications unit 2184 are afforded to the display circuit 2182, whereby the plurality of indicating lamps 2183 are turned on or off.

Specifically, as shown in FIG. 19, the power supply unit 2181 is connected to the electric power line 2013 shown in FIG. 16, and generates electric power to be supplied to the display circuit 2182 and the power-line communications unit 2184 based on the electric power from this electric power line 2013.

The indicating lamps 2183 are made up of a plurality of indicating lamps which display information for each refrigerator container corresponding to the refrigerator operation signal RUN, the preset temperature excess signal TEMP, and the refrigerator abnormal operation signal TROUBLE. The display circuit 2182 controls the turn-on or turn-off operation of the indicating lamps 2183 based on the refrigerator operation information, the preset temperature excess information, and the refrigerator abnormal operation information acquired from the power-line communications unit 2184.

The electric power line 2013 of the container ship 2010 is connected to the refrigerators 2111 of the refrigerated containers 2011-1 to 2011-n, and hence the power line suffers from noise. This sometimes hinders the power-line communication.

Moreover, the length of the electric power line 2013 differs depending on the size of the container ship 2010, and it is sometimes difficult to effect appropriate power-line communication between the communications control apparatus M and the refrigerated containers 2011 if the distance between them is long.

Possible reasons for such troubles in the power-line communication are 1) noise developed in electric appliances of each refrigerated containers 2011; and
2) an impedance drop caused by a capacitor connected to the electric appliances of each refrigerated container 2011.

To prevent the occurrence of these factors, the communications control apparatus M in this embodiment automatically selects a communications route, over which appropriate power-line communication is possible, based on a response obtained from the power-line communications units 2019-1 to 2019-n provided in such a way as to respectively correspond to the refrigerated containers 2011-1 to 2011-n. The refrigerator operation information, the preset temperature excess information, and the refrigerator abnormal operation information are collected from each of the refrigerated containers 2011-1 to 2011-n over the thus selected communications route.

The selection of a communications route by the communications control apparatus M in this embodiment will now be described in detail with reference to FIGS. 20 to 27.

In this embodiment, the power-line communications units 2019-1–2019-n (substations) provided corresponding to the refrigerated containers 2011-1 to 2011-n are respectively provided with addresses to specify each substation. The communications unit 2184 of the communications control apparatus M selects a communication route by carrying out power-line communication between the substations based on these addresses.

Figure 20:
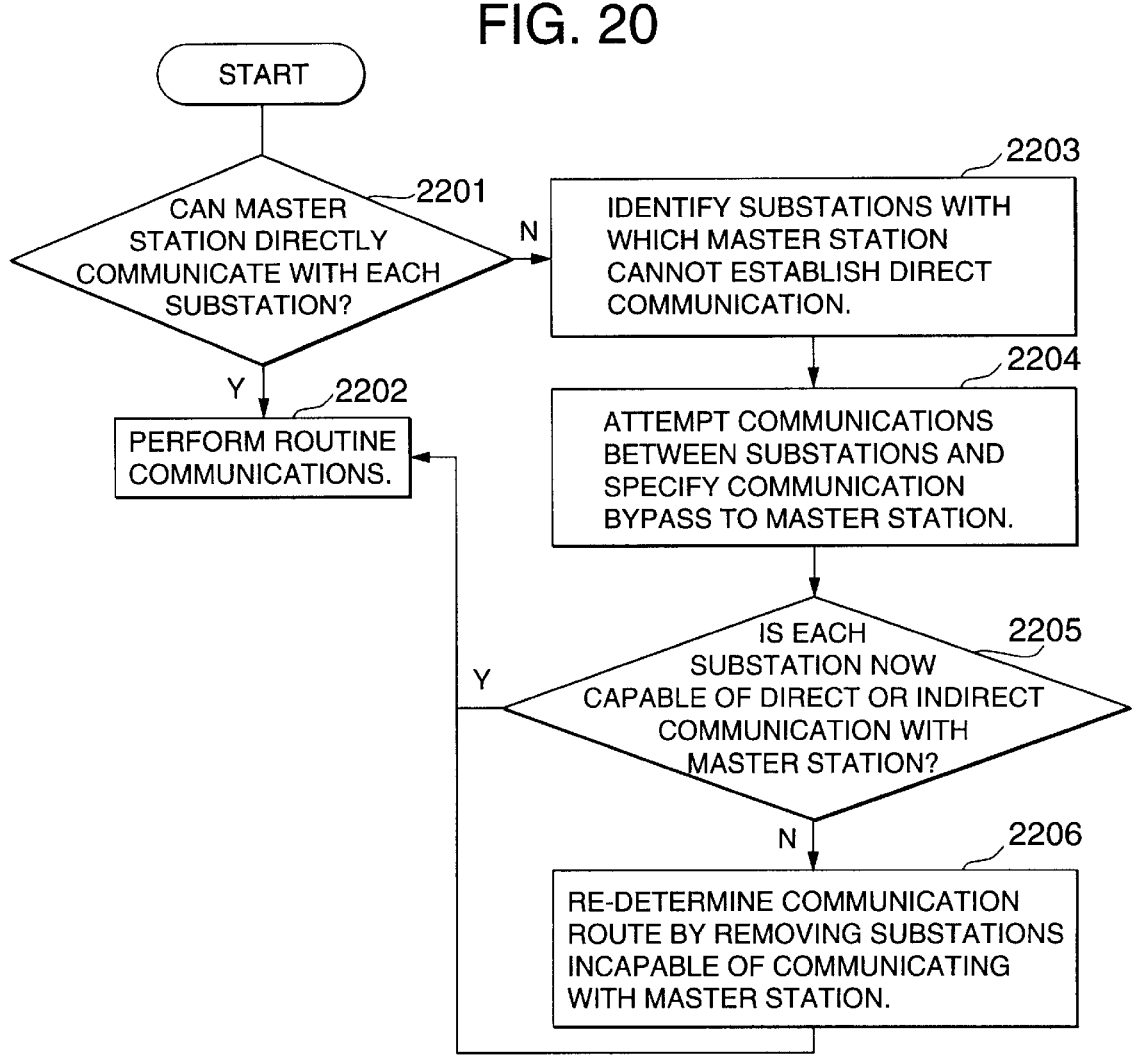
FIG. 20 is a flow chart showing the selection of communication routes by the communications management device shown in FIG. 16.

FIG. 20 is a flow chart showing the selection of a communications route by the communications control apparatus M.

In FIG. 20, the communications control apparatus M drives the power-line communications unit 2184 to check whether or not it is possible to establish a direct communication between the power-line communications unit 2184 (master station) and each of the power-line communications units (substations) 2019-1 to 2019-n provided corresponding to the refrigerated containers 2011-1 to 2011-n (step 2201).

If it is judged in step 2201 that the power-line communications unit 2184 can directly communicate with the power-line communications units 2019-1 to 2019-n provided corresponding to the refrigerated containers 2011-1 to 2011-n, routine communications jobs are performed (step 2202).

The routine communications jobs include the subsequent collection of the refrigerator operation information, the preset temperature excess information, and the refrigerator abnormal operation information from each of the refrigerated containers 2011-1 to 2011-n via the respective power-line communications units 2019-1 to 2019-n by calling, one after the other, the power-line communications units 2019-1 to 2019-n provided corresponding to the refrigerated containers 2011-1 to 2011-n, by polling operations of the communications control apparatus M of the power-line communications unit 2184 using the previously mentioned addresses.

In step 2201, if it is judged that it is impossible to establish a direct communication to the power-line communications units 2019-1 to 2019-n disposed corresponding to the refrigerated containers 2011-1 to 2011-n, a power-line communications unit (substation) for which a direct communication is impossible will be specified from among the power-line communications units 2019-1 to 2019-n disposed corresponding to the refrigerated containers 2011-1 to 2011-n, as a result of the power-line communications to the power-line communications unit 2184 of the communications control apparatus M (step 2203).

Figure 21:
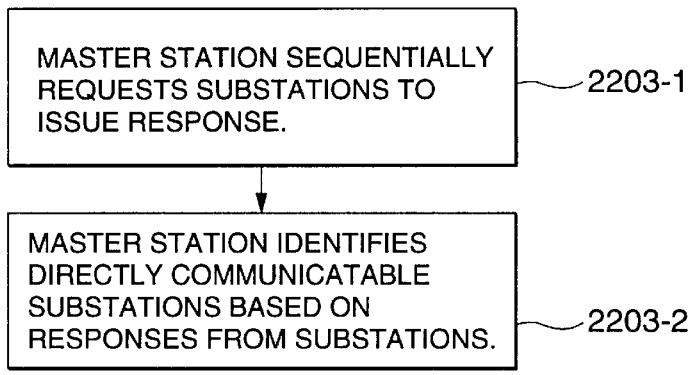
FIG. 21 is a flow chart showing detailed operations carried out in a step 2203 of the flow chart shown in FIG. 20.

The specific operation carried out in step 2203 is as follows:

Namely, as shown in FIG. 21, the power-line communications unit 2184 (master station) of the communications control apparatus M sequentially issues a response request to the power-line communications units 2019-1 to 2019-n (substations) using the previously mentioned addresses (step 2203-1), and the power-line communications unit 2184 (master station) of the communications control apparatus M specifies a power-line communications unit capable of effecting communication from among the power-line communications units 2019-1 to 2019-n depending on a response from each of the power-line communications units 2019-1 to 2019-n (substations) (step 2203-2).

FIG. 22 shows one example of the state of the power-line communications unit specified from among the power-line communications units 2019-1 to 2019-n as a result of the processing above mentioned. In FIG. 22, assuming that the power-line communications units 2019-1 to 2019-n are four units 1 to 4, there are responses from the units 1 and 4, but there are no responses from the units 2 and 3.

In this case, the power-line communications units 1 and 4 are specified as a unit capable of directly communicating with the power-line communications unit 2184 (master station) of the communications control apparatus M.

The power-line communications unit (master station) 2184 of the communications control apparatus M instructs the units 1 and 4 to make an attempt to establish a communication between them (substations). As a result of this attempt, a communications bypass is specified with respect to the units 2 and 3 which cannot directly communicate with the master station M 2184 (step 2204).

The specific operation carried out in step 2204 is as follows:

Namely, as shown in FIG. 23, the power-line communications unit 2184 (master station) of the communications control apparatus M instructs the substations 1 and 4 to issue a response request to other power-line communications units (other substations) (step 2204-1). The power-line communications unit 2184 (master station ) of the communications control apparatus M causes the substations 1 and 4 to report responses they received.

FIG. 24 shows one example of a result reported as a result of the processing in step 2204-2. As is evident from FIG. 24, the power-line communications unit 2184 (master station ) can communicate with the substation 1, and the substation 1 can also communicate with the substation 2.

The power-line communications unit 2184 (master station) can communicate with the substation 4, and this substation 4 can communicate with the substation 3.

The power-line communications unit 2184 (master station) of the communications control apparatus M causes the substations 1 and 4 to perform the same jobs that the master station performs in step 2204-2 and report a result of the execution of the jobs to the master station 2184 (step 2204-3).

FIG. 25 shows one example of a result reported as a result of the processing in step 2204-3. As is evident from FIG. 25, the substation 1 can communicate with the master station 2184 and the substation 2.

The substation 4 can also communicate with the master station 2184 and the substation 3.

In addition, the substation 3 can communicate with the substations 2 and 4.

Based on the result of this report, the power-line communications unit 2184 (master station) of the communications control apparatus M specifies a communications bypass route with respect to the substations 2 and 3 which cannot directly communicate with the master station 2184 (step 2294-4).

FIGS. 26 and 27 show one example of the communications route specified as a result of the processing mentioned above.

According to the report shown in FIG. 25, the substation 1 can communicate with the master station 2184 and substation 2, and the substation 4 can communicate with the master station 2184 and the substation 3. Hence, as shown in FIG. 26, the refrigerator operation information, the preset temperature excess information, and the refrigerator abnormal operation information are collected by carrying out power-line communication between the master station 2184 and the substations 1 and 4. These information items are also collected by effecting power-line communication to the substations 2 and 3 over the bypass which uses the substations 1 and 4 as relay stations.

The substation 3 can communicate with the substations 2 and 4, and hence the refrigerator operation information, the preset temperature excess information, and the refrigerator abnormal operation information are collected by carrying out power-line communication between the substation 1 and the master station 2184 as shown in FIG. 27. Moreover, the same information items are collected by effecting power-line communication to the substation 3 over the bypass which uses the substations 1 and 2 as relay stations. Further, the same information items are collected by effecting power-line communication to the substation 4 over the bypass which uses the substations 1, 2 and 3 as relay stations.

It is possible to obtain a receiving history for all the other substations by using a broadcast signal for the response from the substations.

Turning again to FIG. 20, it is checked whether or not the power-line communications units 2019-1 to 2019-n (substations) disposed corresponding to the refrigerated containers 2011-1 to 2011-n have become possible to directly or indirectly communicate with the power-line communications unit 2184 (master station) of the communications control apparatus M (step 2205). If it is judged that the substations 2019-1 to 2019-n have become possible to directly or indirectly communicate with the master station 2184, the processing will return to step 2202, and the previously mentioned routine communications jobs will be performed.

However, if it is judged that the substations 2019-1 to 2019-n have not become possible neither directly nor indirectly to communicate with the power-line communications unit 2184 (master station) of the communications control apparatus M, the substations 2019-1 to 2019-n will be removed from the system, and a new communications route will be specified again (step 2206). Thereafter, the processing returns to step 2202, and the previously mentioned routine communications jobs are performed.

The communications route is determined again in step 2206 by selecting a route which makes the distance of each communication shortest from among the combination of routes over which communication is possible.

The above embodiment discloses the case where the refrigerated containers are aligned in one line. However, as a matter of course, the refrigerated containers can be arranged into a matrix measuring n×m in a plane or stacked into two layers by selecting an appropriate way of laying the electric power lines.

As mentioned above, according to the present invention, each node holds information as to whether or not data can be transmitted to another node, and it is judged whether or not it is possible to transmit data to a target station node based on that information. If it is judged that data can be transmitted to the target node, a direct link will be established to the target station. On the other hand, if it is judged that data cannot be transmitted to the target station, a relay station will be searched for which can transmit data and establish a link to the node at the target station by reference to the above mentioned information. For this reason, even if a transmission environment becomes deteriorated because of an impedance drop in an electric power line, or the like, resulting from the occurrence of noise in connected electric appliances or the connection of the electric appliances to the electric power line, or if an actual line length of the electric power line becomes longer, it will be possible to carry out stable data transmission.

Moreover, according to the present invention, the plurality of refrigerated containers are respectively provided with power-line communications means, and management information about each of the refrigerated containers is collected by a power-line communications management means by carrying out power-line communication over an electric power line between the power-line communications means and the power-line communications management means. Such a configuration provides the following advantageous results.

1) It is possible to alleviate jobs required when the containers are loaded or unloaded by simple connection or disconnection of the power line from the containers when the containers are loaded or unloaded.

2) The container carrier system only needs the electric power line without a signal line, thereby resulting in a reduced cost.

3) It becomes possible to carry out appropriate power-line communication to containers which are spaced a long distance apart from the power-line communications control means or containers which experience much noise by specifying a communications route.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to a person skilled in the art.

What is claimed is:

1. A power-line data transmission system in which a plurality of nodes each having a power-line communication device are connected together by an electric power line and data is transmitted between the nodes by power-line communication, each of the nodes comprising:

a data transmission possible/impossible information storing means for storing information indicating whether an associated node can perform data transmission with all other nodes;

a data transmission possible/impossible judging means for judging based on the data transmission possible/impossible information whether the associated node can perform data transmission with a target station node;

a link establishing means for establishing a direct link with the target station node when the data transmission possible/impossible judging means judges that the associated node can perform data transmission with the target station node; and a relay station search means for searching for a relay station node with which the associated node can perform data transmission and which can establish a link to the target station node while referring to the data transmission possible/impossible information, when the data transmission possible/impossible judging means judges that the associated node cannot perform data transmission with the target station node.

2. The power-line data transmission system according to claim 1, wherein the relay station search means comprises node information rewriting means for causing the data transmission possible/impossible information storing means to store, as a new relay-possible node, a node that has been newly found by the relay station search to be capable of communicating with the target station node, and for causing the data transmission possible/impossible information storing means to store, as a new relay-impossible node, a node that has been newly found by the relay station search to be incapable of communicating with the target station node.

3. The power-line data transmission system according to claim 1, wherein the relay station search means performs the relay station search simultaneously on all of the nodes.

4. The power-line data transmission system according to claim 1, wherein when the power-line data transmission system boots up, the relay station search means searches for nodes that can serve as relay station nodes for communication with each of the nodes, and causes the data transmission possible/impossible information storing means to separately store relay-possible nodes and relay-impossible nodes based on results of the search.

5. The power-line data transmission system according to claim 1, wherein the data transmission possible/impossible information storing means stores the relay-possible nodes and the relay-impossible nodes such that they are associated with information including a period, a day of the week, and a time zone during which said data is transmitted.

6. The power-line data transmission system according to claim 1, wherein the power-line communication device has a service receptacle for a data terminal.

7. The power-line data transmission system according to claim 6, further comprising a transmission characteristic improvement means provided between the service receptacle and an inlet, for improving a data signal attenuation characteristic.

8. The power-line data transmission system according to claim 1, wherein the nodes are a central control unit and a plurality of electronic display terminals, and said data is transmitted between the electronic display terminals or between the central control unit and one of the electronic display terminals.

9. The power-line data transmission system according to claim 1, wherein the nodes are a central control unit and a plurality of vending machines, and said data is transmitted between the vending machines or between the central control unit and one of the vending machines.

10. The power-line data transmission system according to claim 1, wherein the nodes are a central control unit and a plurality of terminals connected by electric power lines of different phases and said data is transmitted between the terminals or between the central control unit and one of the terminals, said system further comprising a network coupler provided between the power lines of the different phases.

11. A power-line data transmission method in which a plurality of nodes each having a power-line communication device are connected together by an electric power line and data is transmitted between the nodes by power-line communication, comprising the steps of:

in each of the nodes, storing data transmission possible/impossible information indicating whether an associated node can perform data transmission with all other nodes;

judging whether data transmission can be performed with a target station node based on the data transmission possible/impossible information;

establishing a direct link with the target station when it is judged that data transmission can be performed with the target station node; and searching for a relay station with which data transmission can be performed and which can establish a link to the target station node while referring to the data transmission possible/impossible information, when it is judged that data transmission cannot be performed with the target station node.

12. The power-line data transmission method according to claim 11, further comprising the steps of:

storing, as a new relay-possible node, a node that has been newly found by the searching step to be capable of communicating with the target station node; and storing, as a new relay impossible node, a node that has been newly found by the searching step to be incapable of communicating with the target station node.

13. The power-line data transmission method according to claim 11, wherein the searching step is performed simultaneously on all of the nodes.

14. The power-line data transmission method according to claim 11, further comprising the step of searching for nodes that can serve as relay station nodes for communication with each of the nodes, and separately storing relay-possible nodes and relay-impossible nodes based on results of the search, when a power-line data transmission system boots up.

15. The power-line data transmission method according to claim 14, wherein the relay-possible nodes and the relay-impossible nodes are stored such that they are associated with information including a period, a day of the week, and a time zone during which data is transmitted.

16. The power-line data transmission method according to claim 14, wherein the nodes are a central control unit and a plurality of electronic display terminals, and said data is transmitted between the electronic display terminals or between the central control unit and one of the electronic display terminals.

17. The power-line data transmission method according to claim 11, wherein the nodes are a central control unit and a plurality of vending machines, and data is transmitted between the vending machines or between the central control unit and one of the vending machines.

18. A container carrier system which carries a plurality of containers mutually connected by an electric power line for feeding electric power, comprising:
   a plurality of power-line communication means provided for the respective containers; and
   a power-line communication control means for collecting management information of each of the containers by performing power-line communication through the electric power line using the plurality of power-line communication means, the power-line communication control means comprising:
      first extracting means for extracting first power-line communication means with which the power-line communication control means can communicate from among the plurality of power-line communication means by performing power-line communication with the plurality of power-line communication means through the electric power line;
      second extracting means for extracting second power-line communication means with which the power-line communication control means can communicate via the first power-line communication means by performing power-line communication between the first power-line communication means and other power-line communication means through the electric power line; and
      route determining means for determining a route for collecting the management information of each of the containers through the electric power line using the first and second power-line complication means; and
      storing means for storing the route determined by the route determining means.

19. The container carrier system according to claim 18, wherein each of the power-line communication means comprises:
   a signal unit for generating a management signal comprising management information about the associated container;
   a transformer for passing only a signal in a predetermined frequency range and sending it out to the electric power line;
   a power-line communication function unit for receiving and demodulating a signal in the predetermined frequency range, and for modulating the management signal supplied from the signal unit into a signal in the predetermined frequency range and supplying the modulated signal to the transformer; and
   an interface unit for interfacing between the power-line communication function unit and the signal unit.

20. The container carrier system according to claim 18, wherein each of the plurality of power-line communication means has inherent address information.

21. A method for collecting management information of each of a plurality of containers carried by a container carrier system and mutually connected by an electric power line for feeding electric power, comprising the steps of:
   providing a plurality of power-line communication means for the respective containers, and a power-line communication control means;
   extracting first power-line communications means with which the power-line communications control means can communicate from among the plurality of power-line communication means by performing power-line communication with the plurality of power-line communication means through the electric power line;
   extracting second power-line communication means with which the power-line communication control means can communicate via the first power-line communication means by performing power-line communication between the first power-line communications means and other power-line communications means through the electric power line;
   determining a route for collecting the management information of each of the containers through the electric power line using the first and second power-line communication means;
   storing the route; and
   causing the power-line communication control means to collect management information of each of the containers by using the route to perform power-line communication with the first and second power-line communication means through the electric power line.

22. The method according to claim 21, wherein each of the plurality of power-line communications means has inherent address information.

23. A power-line data transmission system in which a plurality of nodes each having a power-line communication device are connected together by an electric power line and data is transmitted between the nodes by power-line communication, each of the nodes comprising:
   a data transmission possible/impossible information storing means for storing information indicating whether an associated node can perform data transmission with other nodes;
   a data transmission possible/impossible judging means for judging based on the data transmission possible/impossible information whether the associated node can perform data transmission with a target station node;
   a link establishing means for establishing a direct link with the target station node when the data transmission possible/impossible judging means judges that the associated node can perform data transmission with the target station node;
   a relay station search means for searching for a relay station node with which the associated node can perform data transmission and which can establish a link to the target station node while referring to the data transmission possible/impossible information, when the data transmission possible/impossible judging means judges that the associated node cannot perform data transmission with the target station node; and
   an information rewriting means for causing the data transmission possible/impossible information storing means to store, as a new relay-possible node, a node that has been newly found by the relay station search to be capable of communicating with the target station node.

24. The power-line data transmission system according to claim 23, further comprising:

an information rewriting means for rewriting the data transmission possible/impossible information storing means to store, as a new relay-impossible node, a node that has been newly found by the relay station search to be incapable of communicating with the target station node.

25. A power-line data transmission method in which a plurality of nodes each having a power-line communication device are connected together by an electric power line and data is transmitted between the nodes by power-line communication, comprising the steps of:

when a sending station node cannot transmit said data to a target station node, searching for a node which can communicate with the target node at the sending station node and designating it as a relay station node at the sending station node;

transmitting said data to the target station node via the relay station node; and when the relay station node is newly found, immediately designating the newly found relay station node as a relay possible node and as immediately available for subsequent data transmission.

26. The power-line data transmission method according to claim 25, further comprising the step of:

when any relay station node is newly found to be incapable of communicating with the target station node, immediately designating such node as a relay impossible node for subsequent data transmission.

27. A power-line data transmission method in which a plurality of nodes each having a power-line communication device are connected together by an electric power line and data is transmitted between the nodes by power-line communication, comprising the steps of:

in each of the nodes, storing data transmission possible/impossible information indicating whether an associated node can perform data transmission with other nodes;

judging whether data transmission can be performed with a target station node based on the data transmission possible/impossible information;

establishing a direct link with the target station when it is judged that data transmission can be performed with the target station node; and searching for a relay station with which data transmission can be performed and which can establish a link to the target station node while referring to the data transmission possible/impossible information, when it is judged that data transmission cannot be performed with the target station node.

rewriting the data transmission possible/impossible information to store, as a new relay-possible node, a node that has been newly found by the relay station search to be capable of communicating with the target station node.

28. The power-line data transmission method according to claim 27, further comprising the step of:

rewriting the data transmission possible/impossible information to store, as a new relay-impossible node, a node that has been newly found by the relay station search to be incapable of communicating with the target station node.

29. A container carrier system which carries a plurality of containers mutually connected by an electric power line for feeding electric power, comprising:

a plurality of power-line communication means provided for the respective containers; and a power-line communication control means for collecting management information of each of the containers by performing power-line communication through the electric power line using the plurality of power-line communication means, storing the management information in a table indicating nodes for which direct and relay communications are possible and nodes for which communication is impossible, and determining a data communication route with reference to the table.

30. A method for collecting management information of each of a plurality of containers carried by a container carrier system and mutually connected by an electric power line for feeding electric power, comprising the steps of:

providing a plurality of power-line communication means for the respective containers, and a power-line communication control means;

causing the power-line communication control means to collect management information of each of the containers by performing power-line communication with the power-line communication means through the electric power line; and storing the management information in a table indicating nodes for which direct and relay communications are possible and nodes for which communication is impossible, and determining a data communication route with reference to the table.

* * * * *